US011649392B2

(12) United States Patent
Lin et al.

(10) Patent No.: US 11,649,392 B2
(45) Date of Patent: May 16, 2023

(54) APPLICATION OF POLYELECTROLYTE COMPLEX NANOPARTICLES TO FLUID LOSS CONTROL OF OIL WELL CEMENTING

(71) Applicant: The Texas A&M University System, College Station, TX (US)

(72) Inventors: Ying-Ying Lin, College Station, TX (US); Jenn-Tai Liang, College Station, TX (US); Corbin D. Andersen, Albuquerque, NM (US)

(73) Assignee: The Texas A&M University System, College Station, TX (US)

( * ) Notice: Subject to any disclaimer, the term of this patent is extended or adjusted under 35 U.S.C. 154(b) by 3 days.

(21) Appl. No.: 16/759,504

(22) PCT Filed: Nov. 3, 2018

(86) PCT No.: PCT/US2018/059108
§ 371 (c)(1),
(2) Date: May 16, 2020

(87) PCT Pub. No.: WO2019/090188
PCT Pub. Date: May 9, 2019

(65) Prior Publication Data
US 2020/0299564 A1 Sep. 24, 2020

Related U.S. Application Data

(60) Provisional application No. 62/581,226, filed on Nov. 3, 2017.

(51) Int. Cl.
| | |
|---|---|
| *C09K 8/487* | (2006.01) |
| *C04B 28/04* | (2006.01) |
| *C04B 40/00* | (2006.01) |
| *C09K 8/514* | (2006.01) |
| *C04B 20/00* | (2006.01) |
| *C09K 8/508* | (2006.01) |
| *C04B 16/02* | (2006.01) |
| *C04B 20/10* | (2006.01) |
| *C04B 103/00* | (2006.01) |
| *C04B 103/46* | (2006.01) |

(52) U.S. Cl.
CPC .......... *C09K 8/487* (2013.01); *C04B 20/0004* (2013.01); *C04B 28/04* (2013.01); *C04B 40/0042* (2013.01); *C09K 8/508* (2013.01); *C09K 8/514* (2013.01); *C04B 16/02* (2013.01); *C04B 20/1048* (2013.01); *C04B 2103/0084* (2013.01); *C04B 2103/46* (2013.01); *C09K 2208/10* (2013.01)

(58) Field of Classification Search
CPC ........ C09K 8/487; C09K 8/508; C09K 8/514; C09K 2208/10; C04B 20/0004; C04B 28/04; C04B 40/0042; C04B 2103/0084; C04B 2103/46; C04B 20/1048; C04B 16/02; C04B 40/0039
See application file for complete search history.

(56) References Cited

U.S. PATENT DOCUMENTS

| | | | |
|---|---|---|---|
| 2,614,998 A | 10/1952 | Lea et al. | |
| 4,265,311 A * | 5/1981 | Ely | E21B 43/17 507/216 |
| 11,034,883 B2 | 6/2021 | Johnson et al. | |
| 2007/0284104 A1* | 12/2007 | Beckman | C04B 40/0039 166/293 |
| 2008/0058229 A1* | 3/2008 | Berkland | C09K 8/706 507/211 |
| 2012/0090841 A1* | 4/2012 | Reddy | C04B 24/383 166/293 |
| 2014/0209305 A1* | 7/2014 | Lin | C09K 8/604 166/270.1 |
| 2016/0001768 A1 | 1/2016 | Chatterji et al. | |
| 2016/0115371 A1* | 4/2016 | Johnson | C09K 8/588 166/263 |
| 2019/0071598 A1 | 3/2019 | Lin et al. | |

FOREIGN PATENT DOCUMENTS

| | | |
|---|---|---|
| CA | 2346169 | 8/2010 |
| EP | 1565643 | 8/2005 |

OTHER PUBLICATIONS

European Search Report dated Jul. 23, 2021 for European Application No. 18872864.6.
M.J. Rogers, R.L. Dillenbeck, R.N. Eid, Transition time of cement slurries, definitions and misconceptions, related to annular fluid migration, SPE Annual Technical Conference and Exhibition, Society of Petroleum Engineers, 2004.
E.F. Lucas, C.R. Mansur, L. Spinelli, Y.G. Queirós, Polymer science applied to petroleum production, Pure and Applied Chemistry, 81 (2009) 473-494.

(Continued)

*Primary Examiner* — Kumar R Bhushan
(74) *Attorney, Agent, or Firm* — Thomas | Horstemeyer, LLP

(57) ABSTRACT

A variety of fluid loss control compositions and methods are provided for controlling fluid loss in a cementing operation. As described herein, polyelectrolyte complex nanoparticles and fluid loss control compositions containing polyelectrolyte complex nanoparticles can be effective for fluid loss control in a variety of cementing operations. Methods of making and methods of using the electrolyte complex nanoparticles and fluid loss control compositions containing polyelectrolyte complex nanoparticles are also provided. The polyelectrolyte complex nanoparticles can include a polycation polymer such as a branched chain polyethylenimine, and a polyanion polymer such as polyacrylic acid or poly(vinylsulfonic) acid. The polyelectrolyte complex nanoparticles can contain additional additives such as metal ions or fluid loss additives such as a cellulose polymer.

15 Claims, 11 Drawing Sheets

(56) References Cited

OTHER PUBLICATIONS

S. Pelipenko, I. Frigaard, Mud removal and cement placement during primary cementing of an oil well—Part 2; steady-state displacements, Journal of Engineering Mathematics, 48 (2004) 1-26.
S. Bittleston, J. Ferguson, I. Frigaard, Mud removal and cement placement during primary cementing of an oil well-Laminar non-Newtonian displacements in an eccentric annular Hele-Shaw cell, Journal of Engineering Mathematics, 43 (2002) 229-253.
S. Bittleston, D. Guillot, Mud removal: research improves traditional cementing guidelines, Oilfield Review, 3 (1991) 44-54.
G.E. King, An Introduction to the Basics of Well Completions, Stimulations and Workovers, Tulsa, Oklahoma, 1998.
R. Gandelman, C. Miranda, K. Teixeira, A.L. Martins, A. Waldmann, On the rheological parameters governing oilwell cement slurry stability, Annual transactions of the nordic rheology society, 12 (2004) 85-91.
S. Crema, C. Kucera, G. Konrad, New Fluid-Loss Additives for Oilfield Cementing, SPE Production Operations Symposium, Society of Petroleum Engineers, 1989.
R.B. Jackson, The integrity of oil and gas wells, Proceedings of the National Academy of Sciences, 111 (2014) 10902-10903.
R.D. Vidic, S.L. Brantley, J.M. Vandenbossche, D. Yoxtheimer, J.D. Abad, Impact of shale gas development on regional water quality, Science, 340 (2013) 1235009.
R.J. Davies, S. Almond, R.S. Ward, R.B. Jackson, C. Adams, F. Worrall, L.G. Herringshaw, J.G. Gluyas, M.A. Whitehead, Oil and gas wells and their integrity: Implications for shale and unconventional resource exploitation, Marine and Petroleum Geology, 56 (2014) 239-254.
S. Gubbala, Polyelectrolyte complex: a pharmaceutical review, Int J Pharm Biol Sci, 2 (2012) 399-407.
S. Lankalapalli, V.M. Kolapalli, Polyelectrolyte complexes: A review of their applicability in drug delivery technology, Indian journal of pharmaceutical sciences, 71 (2009) 481.
R. Barati, S.J. Johnson, S. McCool, D.W. Green, G.P. Willhite, J.T. Liang, Fracturing fluid cleanup by controlled Yelease of enzymes from polyelectrolyte complex nanoparticles, Journal of Applied Polymer Science, 121 (2011) 1292-1298.
R. Barati, S.J. Johnson, S. McCool, D.W. Green, G.P. Willhite, J.T. Liang, Polyelectrolyte complex nanoparticles for protection and delayed release of enzymes in alkaline pH and at elevated temperature during hydraulic fracturing of oil wells, Journal of Applied Polymer Science, 126 (2012) 587-592.
M. Cordova, M. Cheng, J. Trejo, S.J. Johnson, G.P. Willhite, J.-T. Liang, C. Berkland, Delayed HPAM gelation via transient sequestration of chromium in polyelectrolyte complex nanoparticles, Macromolecules, 41 (2008) 4398-4404.
F. Dugonjić-Bilić, J. Plank, Polyelectrolyte complexes from polyethylene imine/acetone formaldehyde sulfite polycondensates: a novel reagent for effective fluid loss control of oil well cement slurries, Journal of Applied Polymer Science, 121 (2011) 1262-1275.
J. Plank, N.R. Lummer, F. Dugonjic-Bilic, D. Sadasivan, Comparative Study of the Working Mechanisms of Different Cement Fluid Loss Polymers, SPE International Symposium on Oilfield Chemistry, Society of Petroleum Engineers, 2009.
D. Bülichen, J. Plank, Mechanistic study on carboxymethyl hydroxyethyl cellulose as fluid loss control additive in oil well cement, Journal of Applied Polymer Science, 124 (2012) 2340-2347.
E.B. Nelson, Well Cementing, Schlumberger Educational Services2009.
L.F. McKenzie, P.M. McElfresh, Acrylamide/acrylic acid copolymers for cement fluid loss control, SPE Oilfield and Geothermal Chemistry Symposium, Society of Petroleum Engineers, 1982.
R. Salehi, A.M. Paiaman, A novel cement slurry design applicable to horizontal well conditions, Petroleum & Coal, 51 (2009) 270-276.
H. Roshan, M. Asef, Characteristics of oilwell cement slurry using CMC, SPE Drilling & Completion, 25 (2010) 328-335.
International Search Report issued for PCT/US2018/059108, dated Dec. 31, 2018.

\* cited by examiner

APPLICATION OF POLYELECTROLYTE COMPLEX NANOPARTICLES TO FLUID LOSS CONTROL OF OIL WELL CEMENTING

CROSS-REFERENCE TO RELATED APPLICATIONS

This application is a National Stage of International Application No. PCT/US2018/059108, filed Nov. 3, 2018, which claims priority to, and the benefit of, U.S. provisional application entitled "APPLICATION OF POLYELECTROLYTE COMPLEX NANOPARTICLES TO FLUID FOSS CONTROL OF OIL WELL CEMENTING" having Ser. No. 62/581,226, filed Nov. 3, 2017, the contents of which are incorporated by reference in their entirety.

TECHNICAL FIELD

The present disclosure generally relates to fluid loss control.

BACKGROUND

Cementing is fundamental to the process of drilling and completing an oil well. It involves pumping a cement slurry down tubing and up into the annular space between the casing and the borehole wall. The main goal of this cement sheath is to prevent fluid communication between layers and to provide support for the casing string. Unwanted and uncontrolled movement of fluid in the reservoir can impair the efficiency of hydrocarbon recovery and may even lead to a devastating blowout. Because of the complexities of the underground environment, cement slurries must be carefully designed to ensure proper placement and setting.

Fluid loss control, gas channeling, transition time, slurry stability, and mixture viscosity are among the many important factors that engineers must consider when formulating slurries [1]. For many years, the industry has utilized special polymers to individually remedy these issues [2]. Some of these additives include fluid loss control agents, thickening agents, friction reducers, accelerators, and retarders. By remedying individual problems, however, other complications often arise. For instance, a polymer developed to prevent fluid loss may lead to an increased slurry viscosity. A highly viscous slurry requires extra pumping force and cannot always be pumped at high enough rates to effectively displace the drilling mud from the borehole [3-6]. Alternatively, a friction reducing polymer that remediates the viscosity issues may result in slurry settling and sedimentation [7]. Such a slurry will result in poorly cured cement and the possibility of fluid channeling [7, 8]. Additionally, some types of additives have negative interactions when combined. For instance, a commonly used sulfonated material meant to function as a viscosity reducer may actually increase the viscosity of a slurry when used with certain cellulosic fluid loss control additives (FLA) [9]. Many of these challenges have proven difficult to overcome as evidenced by the number of well barrier failures that still occur [10-12]. This is especially significant among unconventional and tight reservoirs that have been shown to be even more prone to leakage than conventional ones [12]. As more of these unconventional resources are exploited, this problem will only worsen unless new solutions are developed.

There remains a need for improved compositions and methods for fluid loss control that overcome the aforementioned deficiencies.

SUMMARY

In various aspects, fluid loss control compositions, methods of making, and methods of use thereof are provided that overcome one or more of the aforementioned deficiencies. In particular, the fluid loss control compositions and methods offer several advantages as compared to conventional fluid loss control additives.

In some aspects, a fluid loss control composition is provided containing polyelectrolyte complex nanoparticles formed of at least the following components: (i) a polycation polymer, and (ii) a polyanion polymer. In some aspects, the polyelectrolyte complex nanoparticles also include conventional fluid loss control additives such as cellulose polymers. In some aspects, the polyelectrolyte complex nanoparticles further include a plurality of metal ions.

As a particular example, fluid loss control compositions are provided including polyelectrolyte complex nanoparticles formed of (i) a branched chain polyethylenimine having a molecular weight of about 800 Da to about 2500 kDa, (ii) a polyacrylic acid or poly(vinylsulfonic) acid having a molecular weight of about 4000 Da to about 20 kDa, and (iii) one or both of a plurality of metal ions and a fluid loss additive polymer such as carboxymethyl hydroxyethyl cellulose. The fluid loss control compositions have been found to provide superior fluid loss control properties as compared to convention fluid loss compositions. In particular, the compositions have been found to exhibit a fluid loss that is at least as good or better than convention fluid loss products, while exhibiting plastic viscosities across the entire acceptable range that were lower than control samples achieving the same fluid loss.

Other systems, methods, features, and advantages of the compositions and methods for fluid loss control will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

DETAILED DESCRIPTION

Figure 1:
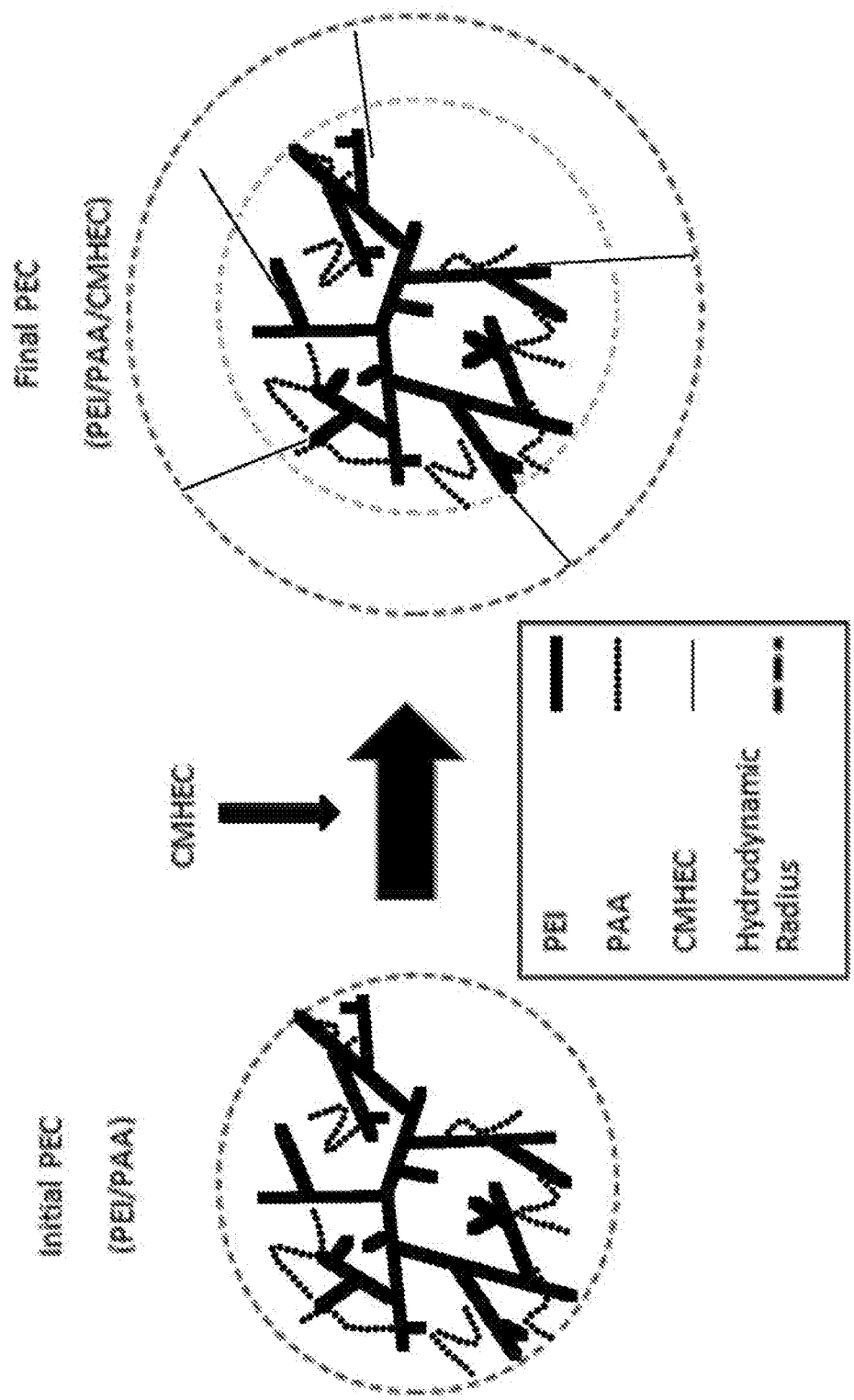
FIG. 1 is a schematic of an exemplary mechanism and structure of polyelectrolyte complexes (PEC) nanoparticle formation.

Described herein are compositions and methods for applying polyelectrolyte complex (PEC) nanoparticles to control fluid loss in oil well cements. Various polyelectrolyte complex (PEC) nanoparticles are described in this disclosure. In some aspects, the PEC nanoparticles described herein include a mixture of commonly used cementing polymers: carboxymethyl hydroxyethyl cellulose (CMHEC) as a primary fluid loss additive (FLA), gelling agent and retarder [22-24]; polyethylenimine (PEI, Mw 2,000,000 Da) as a secondary FLA and viscosifier [21, 22]; and polyacrylic acid (PAA) as a retarder [9, 25, 26] and moderate friction reducer. In some aspects, the PEC nanoparticles do not have CMHEC entrapment. In some aspects, the PEC nanoparticles include polyethylenimine (PEI, Mw 25,000 Da) and PAA, but do not have CMHEC entrapment. In some aspects, the PEC nanoparticles include polyethylenimine (PEI, Mw 25,000 Da), PAA, and metal ions, but do not have CMHEC entrapment.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; or a unit disclosed 100° F. is intended to mean an equivalent dimension of 37.8° C.; and the like) as understood by a person of ordinary skill in the art.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The term "fluid loss control composition," as used herein, refers to a multi-component composition that can be added to a cement slurry to decrease the fluid loss of the cement slurry as compared to the fluid loss of the otherwise same cement slurry except without the fluid loss composition. As such, a fluid loss control composition will generally not include, as a part of the composition, materials or additives that will prevent the cement setting process or that will result in the cement being unfit for use in cementing operations. The term "fluid loss additive," as used herein, refers to a single additive that can be added to a cement slurry to decrease the fluid loss of the cement slurry as compared to the fluid loss of the otherwise same cement slurry except without the fluid loss additive. A fluid loss control composition can include one or more fluid additives or can include one or more materials that, when used individually, are not fluid loss additives, but when provided as part of a multi-component composition function together with other components of the composition to provide fluid loss control.

The term "cement slurry," as used herein, refers to a fluid composition including cement and includes, for instance, foamed cements. The term "cement," as used herein, can include hydraulic cement as well as other types of materials (e.g., polymers like epoxies and latexes) which can be used in place of, or in addition to, a hydraulic cement. Examples of cements can include, but are not limited to, hydraulic cements, Portland cements, gypsum cements, calcium phosphate cements, high alumina content cements, silica cements, high alkalinity cements, shale cements, acid/base cements, magnesia cements (e.g., Sorel cements), fly ash cements, zeolite cement systems, cement kiln dust cement systems, slag cements, micro-fine cements, epoxies, bentonites, latexes, and the like, any derivative thereof, and any combination thereof. As used herein, the term "fluid" refers to any substance that is capable of flowing. The fluid can include particulate solids, liquids, gases, slurries, emulsions, powders, muds, glasses, combinations thereof, and the like. In some aspects, the fluid can be an aqueous fluid, including water or the like. In some aspects, the fluid can be a non-aqueous fluid, including organic compounds, more specifically, hydrocarbons, oil, a refined component of oil, petrochemical products, and the like. In some embodiments, the fluid can be a treatment fluid (e.g., a spacer fluid, a cement fluid composition, a lost circulation treatment fluid, and the like) or a formation fluid as found in the oil and gas industry. Fluids can include various flowable mixtures of solids, liquids, and/or gases. Illustrative gases that can be considered fluids according to the present embodiments include, for example, air, nitrogen, carbon dioxide, argon, helium, hydrogen sulfide ($H_2S$), methane, ethane, butane, and other hydrocarbon gases, combinations thereof and/or the like.

As used herein, the term "cement setting process" refers to the chemical reaction(s) that cause a cement slurry to harden into a cement. Chemical reactions of cement setting processes described herein may include, but are not limited to, hydration reactions (e.g., reactions between hydraulic cements and water), crosslinking reactions (e.g., polymer crosslinking reactions and reactions between 2-component epoxies), and the like, and any combination thereof. As used herein, the term "hydraulic cement" refers to a cement that hardens in the presence of water.

As used herein, the term "cementing operation" encompasses any subterranean operation utilizing a cement slurry for example in primary cementing operations, secondary cementing operations, squeeze operations, remedial cementing operations, casing operations, plugging operations (e.g., relative to thief zones), lost circulation operations, zonal isolation operations, and the like, including any of the foregoing with traditional or reverse fluid flow directions.

The term "cellulose polymer," as used herein, means any polysaccharide polymer having in its structure sequences of glucose residues linked together via β-1,4 linkages. The cellulose polymers can include unsubstituted celluloses, anionic celluloses, cationic celluloses, amphoteric celluloses or non-ionic celluloses. Thus, the cellulose polymers can be chosen from unsubstituted celluloses, including in a microcrystalline form, and cellulose ethers. Among these cellulose polymers, cellulose ethers, cellulose esters and cellulose ester ethers are distinguished. Among the cellulose esters are inorganic esters of cellulose (cellulose nitrates, sulfates, phosphates, etc.), organic cellulose esters (cellulose monoacetates, triacetates, amidopropionates, acetatebutyrates, acetatepropionates and acetatetrimellitates, etc.), and mixed organic/inorganic esters of cellulose, such as cellulose acetatebutyrate sulfates and cellulose acetatepropionate sulfates. Among the cellulose ester ethers, mention may be made of hydroxypropylmethylcellulose phthalates and ethylcellulose sulfates.

The terms "polycation polymer" and "polyanion polymer" as used herein, refer to a class of polyionic polymers, which include polymeric and oligomeric molecules including multiple charged repeat units each carrying a non-zero formal charge that are part of or linked to a common backbone. The term "polyion" should not be mistaken with the term "polyvalent ion", which commonly refers to an ion with a formal charge on an individual molecule or repeat unit that is higher than +1 (or lower than −1). In some aspects, the term "polycation" is interchangeable with the term "positively charged polyelectrolyte" and that the term "polyanion" is interchangeable with the term "negatively charged polyelectrolyte."

The term "molecular weight", as used herein, generally refers to the mass or average mass of a material. If a polymer or oligomer, the molecular weight can refer to the relative average chain length or relative chain mass of the bulk polymer. In practice, the molecular weight of polymers and oligomers can be estimated or characterized in various ways including gel permeation chromatography (GPC) or capillary viscometry. GPC molecular weights are reported as the weight-average molecular weight (Mw) as opposed to the number-average molecular weight (Mn). Capillary viscometry provides estimates of molecular weight as the inherent viscosity determined from a dilute polymer solution using a particular set of concentration, temperature, and solvent conditions.

The term "average diameter", as used herein, generally refers to the statistical mean particle size (diameter) of the particles in the composition. The diameter of an essentially spherical particle may be referred to as the physical or hydrodynamic diameter. The diameter of a non-spherical particle may refer preferentially to the hydrodynamic diameter. As used herein, the diameter of a non-spherical particle may refer to the largest linear distance between two points on the surface of the particle. Average diameter can be measured using methods known in the art, such as dynamic light scattering. Two populations can be said to have a "substantially equivalent mean particle size" when the statistical mean particle size of the first population of particles is within 20% of the statistical mean particle size of the second population of particles; more preferably within 15%, most preferably within 10%.

The term "dry blending" as used herein means the process by which two or more particulate compositions are thoroughly mixed while maintaining the integrity of the individual particles and without benefit of an additional material such as a solvent to aid in the processing. A "dry blend" is thus a resultant mixture of a dry blending process.

Fluid Loss Control Compositions and Methods of Use Thereof

In various aspects, fluid loss control compositions and methods of making and methods of use thereof are provided that overcome some of the aforementioned deficiencies. As a particular example, fluid loss control compositions are provided including polyelectrolyte complex nanoparticles formed of (i) a branched chain polyethylenimine having a molecular weight of about 800 Da to about 2500 kDa, (ii) a polyacrylic acid or poly(vinylsulfonic) acid having a molecular weight of about 4000 Da to about 20 kDa, and (iii) one or both of a plurality of metal ions and a fluid loss additive polymer such as carboxymethyl hydroxyethyl cellulose. The fluid loss control compositions have been found to provide superior fluid loss control properties as compared to convention fluid loss compositions. In particular, the compositions have been found to exhibit a fluid loss that is at least as good or better than convention fluid loss products, while exhibiting plastic viscosities across the entire acceptable range that were lower than control samples achieving the same fluid loss.

The mechanism of CMHEC as a FLA was described by Bülichen and Plank [23]. They found that, at low concentrations (less than ~0.4 wt % bwoc), the additive adsorbs to the cement particles, protrudes into the pores, and hinders filtration which provides moderate filtration control. At higher concentrations (above the "overlapping" concentration), however, CMHEC forms associated polymer networks wherein the polymer effectively plugs the pores of the filter cake resulting a substantial improvement in fluid loss control.

Cellulose compounds are also beneficial as FLAs because they bind large amounts of water, which prevents it from filtering out into the formation [22]. Due to the significant increase in slurry viscosity, issues of over-retardation, and limitations on temperature, however, cellulosic FLAs can be problematic [24]. Alternatively, by entrapping CMHEC in a PEC nanoparticle, we demonstrate that we can prevent or delay excessive viscosity buildup, limit retardation, and achieve excellent fluid loss control while maintaining other desirable cement slurry properties.

In various aspects, a fluid loss control composition is provided containing polyelectrolyte complex nanoparticles formed of at least the following components: (i) a polycation polymer, and (ii) a polyanion polymer. Applicants have found that fluid loss control compositions containing polyelectrolyte complex nanoparticles can provide improved fluid loss control as compared to conventional fluid loss control additives.

In some aspects, the polyelectrolyte complex nanoparticles further include a conventional fluid loss additive. By incorporating the conventional fluid loss additive into the polyelectrolyte complex nanoparticles of the instant disclosure, applicants have found that the fluid loss control can be improved as compared to the fluid loss control of the save fluid loss additive in the absence of the polyelectrolyte complex nanoparticles. Examples of conventional fluid loss control additives include cellulose derivatives such a carboxymethyl hydroxyethyl cellulose (CMHEC), \ and hydroxyethyl cellulose (HEC), and polyethylene amines, naphthalene sulfonates, polymer latex, and polyacrylamides. In some aspects, the conventional fluid loss additive is a polymer such as a cellulose polymer. The cellulose polymer has a molecular weight of about 30, 40, or 50 60 kDa to about 60, 80, 100, or 120 kDa.

The fluid loss control composition can further include a plurality of metal ions. In some aspects, the metal ions are within the nanoparticles. In some aspects, the metal ions are on the surface of the nanoparticles. The metal ions can also be both within the nanoparticles and on the surface of the nanoparticles. The metal ions can include chromium ions, zirconium, titanium, aluminum ions, or a combination thereof.

The polyelectrolyte complex nanoparticles include a polycation polymer. The polycation polymer can include a variety of functional groups, e.g. amine functional groups. In some aspects, the polycation polymer is a polyamine. The polycation polymer, can include, for example a polyethylenimine homopolymer or copolymer. The polycation polymer can be linear or branched. The polycation polymer can have a molecular weight of about 800 Da, 1 kDa, or 20 kDa to about 2000 kDa, 2500 kDa, or 3000 kDa.

The polyelectrolyte complex nanoparticles include a polyanion polymer. The polyanion polymer can include a variety of functional groups, e.g. carboxylic acid or sulfonic acid functional groups. In some aspects, the polyanion polymer is a polyacrylic acid or poly(vinylsulfonic) acid homopolymer or copolymer. The polyanion polymer can be linear or branched. The polyanion polymer can have a molecular weight of about 2 kDa, 4 kDa, or 6 kDa to about 12 kDa, 16 kDa, 20 kDa, or 30 kDa.

The polyelectrolyte complex nanoparticles can have any suitable size to provide for the desired fluid loss control, cement slurry viscosity, etc. In some aspects, the polyelectrolyte complex nanoparticles have an average diameter of about 100 nm, 150 nm, or 200 nm to about 1 micron, 1.5 microns, or 2 microns. In some aspects, the nanoparticles have an average diameter of about 100 nm, 120 nm, or 140 nm to about 400 nm, 500 nm, or 600 nm.

The polyelectrolyte complex nanoparticles should generally be stable enough to provide fluid loss control over the time period of the cement setting process, long enough to be suitable for use in cementing operations. In some aspects, at least 40%, at least 50%, or at least 60% of the polyelectrolyte complex nanoparticles are stable for a period of at least 2 days, 5 days, or 7 days at a temperature of about 150° C., about 65° C., or about 40° C.

Methods of making the fluid loss control compositions are also provided. The methods can include combining, blending, dry mixing, or otherwise contacting the polycation polymer with any additives, if present, to form a first mixture. The additives can include any fluid loss control additives described herein. In particularly preferred aspects, the additives include cellulose polymers, metal ions, or a combination thereof. The methods can include combining, blending, dry mixing, or otherwise contacting the first mixture with the polyanion polymer to form the fluid loss control composition including the polyelectrolyte complex nanoparticles.

Methods of preparing slurry compositions are also provided. Cement slurry compositions are used in the oil and gas industry to cement the annular space in the well bore between the casing and the surrounding formation. Cementing operations are done not only to secure the casing firmly in place but also to cement off permeable zones of permeable formations into which valuable materials may be lost and to prevent the intrusion of extraneous matter into the petroleum fluid producing zone. The slurry compositions can be prepared by preparing a slurry comprising polyelectrolyte complex nanoparticles as described herein in a suitable fluid or solvent, e.g. water, and adding an effective amount of a fluid loss additive to the slurry. In some aspects, the methods include dry blending a fluid loss additive powder and a dry cement powder to create a dry mixture; and adding the dry mixture to a suspension containing polyelectrolyte complex nanoparticles as described herein in water to form the slurry.

In various aspects, methods of fluid loss control in a cementing operation are provided. The methods can be applied in any cementing operation to prevent or reduce the loss of fluids in a cementing operation. The methods and compositions can provide for improved fluid loss control, e.g. by providing less fluid loss, lower viscosity slurries, improved structure integrity of the cured cement, and/or reduced cement slurry porosity and permeability as compared to the otherwise same cementing operation without using the fluid loss control compositions described herein.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Material and Methods:

Materials:

Portland H-Class cement (provided by Lafarge North America Inc. of Lafarge Holcim group, Chicago, Ill.); branched PEI, 25% solution, exhibiting a weight-average molecular weight ($M_w$) of 2,000 k Da (purchased from Polsyciences Inc., Warrington, Pa.); branched PEI, exhibiting a weight-average Mw of 25 k Da and 800 Da (purchased from Sigma-Aldrich, St. Louis, Mo.); powdered CMHEC of nominal $M_w$ 80 k Da (HC 50 NP2, provided by SE Tylose GmbH & Co KG, Wisebaden, Germany); PAA, 42% solution, of an expected $M_w$ of 14 k Da (Flosperse™ 3000, provided by SNF Holding Co., Riceboro, Ga.), 25% Polyvinyl sulfonate, Chromium(III) chloride hexahydrate (purchased from Sigma-Aldrich, St. Louis, Mo.); lignosulfonate retarder and FLA commercial product provided by Halliburton.

Cement Slurry Preparation Procedure:

To prepare one batch of cement slurry which means 860 g of Portland H cement:

For Polyelectrolyte Complex (PEI25k/PAA and PEI25k/PAA-Cr) without Entrapping CMHEC:

CMHEC powder will be firstly dry blended with 760 g of cement powder to make CMHEC-cement mixture. The remaining 100 g cement powder will be weighed and placed in a container ready for use. First of all, PEC nanoparticle suspension and water will be placed in the blender cup. Then, 100 g of cement powder and CMHEC-cement mixture will be added to the blender in 15 sec at a mixing rate of 4000 rpm, in order, followed by mixing at 12,000 rpm for 35 sec.

100 g cement should be added to the blender cup to mix with PEC and water before CMHEC-cement mixture to avoid further interaction of CMHEC and PEC forming unnecessary complexes. With the addition of cement to the PEC suspension-water mixture, pH of the mixture will be increased to a point that no further PEC-CMHEC complex can be formed.

For Polyelectrolyte Complex Entrapping CMHEC:

PEC and water will be weighed and placed in the blender cup. Then 860 g of cement powder will be added to the blender in 15 sec at a mixing rate of 4000 rpm followed by mixing at 12,000 rpm for 35 sec.

Polyelectrolyte Complex Preparation:

For PEC Entrapping CMHEC:

The PECs were prepared by combining the three polymer components in the following order. First, the appropriate amount of PEI solution is added to a constant speed blender (OFI Testing Equipment Inc., Houston, Tex.) and allowed to blend at 4,000 rpm. Next, the PAA solution is added quickly and continuously to the PEI solution with continued mixing. The CMHEC solution (pre-dissolved in water) is then quickly added to the blending mixture in 15 seconds. Finally, the mixing speed is increased to 12,000 rpm and blend for another 35 seconds to ensure adequate mixing. The component stock solutions and mixture ratios are provided in Table 1.

TABLE 1

| Polyelectrolyte complexes (PEC) nanoparticle composition. | | | | |
|---|---|---|---|---|
| Component | Polymer Stock Soln. (wt %) | Mix Ratio (parts) | Component Concentration (wt %) | Component Concentration (ppm) |
| PEI | 6 | 3 | 1.6364 | 16,364 |
| PAA | 3 | 3 | 0.8182 | 8,182 |
| CMHEC | 2 | 5 | 0.9091 | 9,091 |

For PEC without Entrapping CMHEC:

PEI25k/PAA PECs were prepared by combining the two polymer components in the following order. First, the appropriate amount of PEI solution is added to a constant speed blender (OFI Testing Equipment Inc., Houston, Tex.) and allowed to blend at 4,000 rpm. Next, the PAA solution is added quickly and continuously to the PEI solution with continued mixing for 30 seconds.

PEI25k/PAA-Cr PECs were prepared by combining the two polymers and one metal ion solution components in the following order. First, the appropriate amount of PEI solution is added to a constant speed blender (OFI Testing Equipment Inc., Houston, Tex.) and allowed to blend at 4,000 rpm. Next, the PAA solution is added quickly and continuously using a syringe to the PEI solution. Then the Cr solution (pre-dissolved in water) is then quickly added to the blending mixture using a syringe with a needle and continued mixing for 30 seconds at 4,000 rpm.

Measurement of CMHEC by HPLC

Figure 7A:
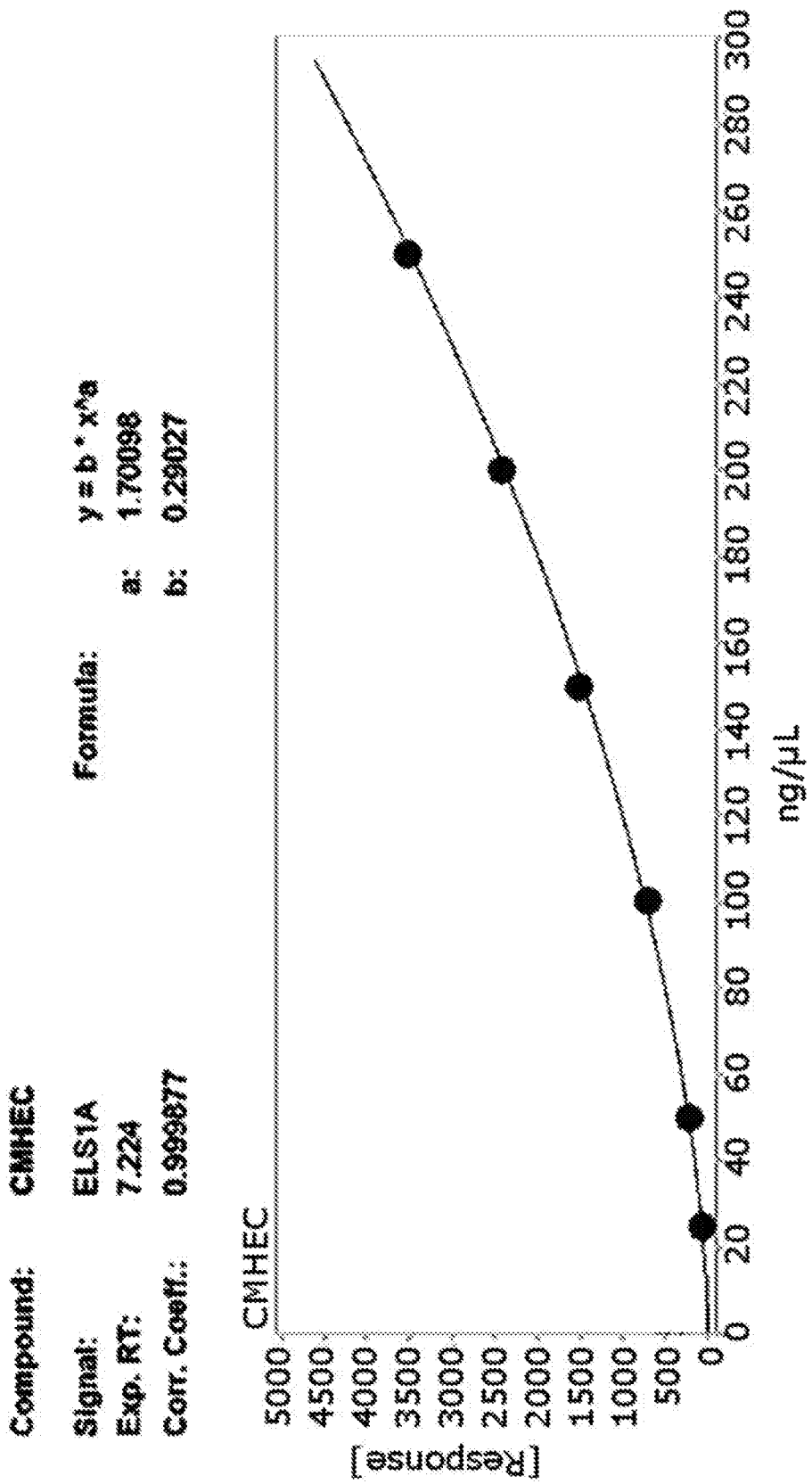
FIG. 7A is an exemplary carboxymethyl hydroxyethyl cellulose (CMHEC) calibration curve.
Figure 7B:
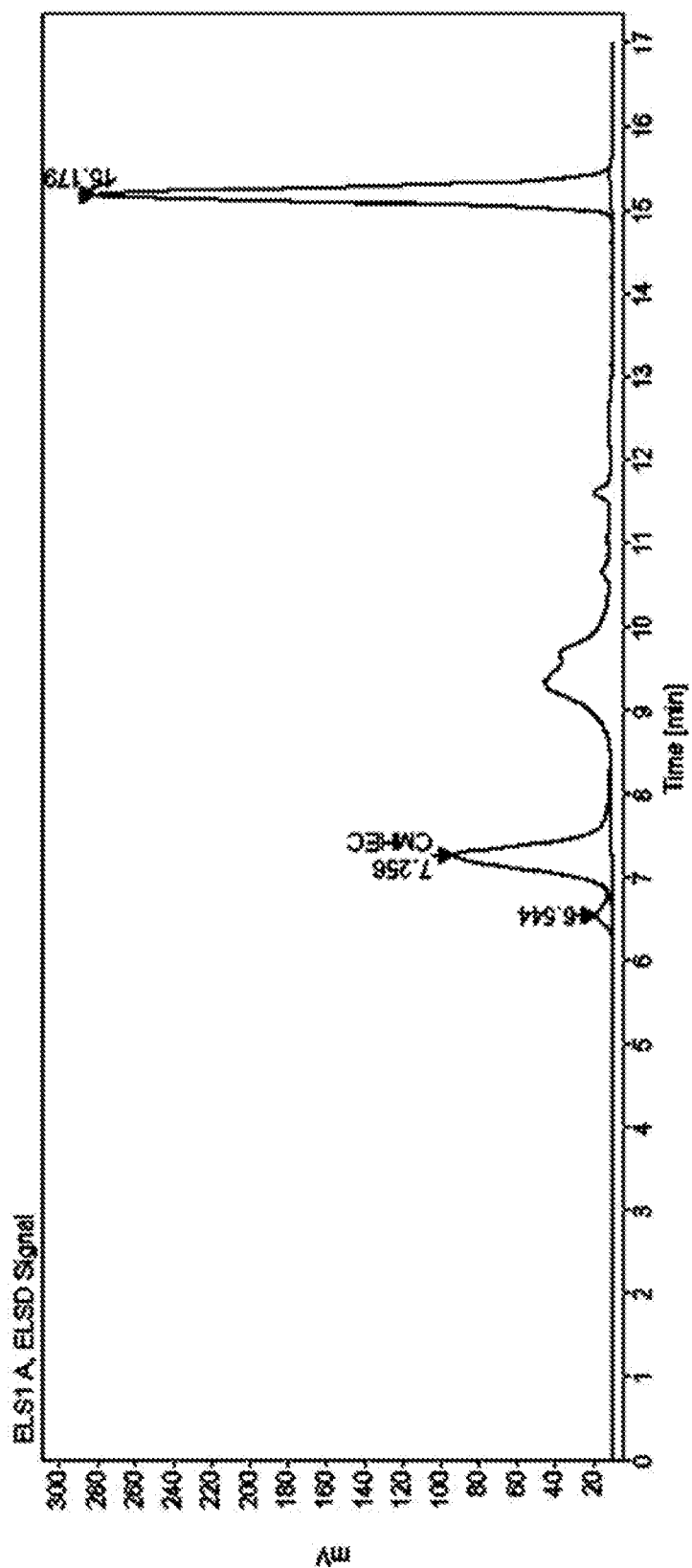
FIG. 7B is an exemplary polyelectrolyte complex (PEC) chromatogram prepared without centrifugation.

The system parameters are given in Table 2. FIG. 7A gives an example of a calibration curve utilizing standards of CMHEC. Applying a power law equation, a correlation coefficient of 0.9999 was obtained, demonstrating an excellent fit with the data. The fitting parameters for 'A' and 'B' were 1.70098 and 0.29027 respectively, corresponding to a calibration curve of y=0.29027x^1.70098. An example of a sample chromatogram is given in FIG. 7B.

TABLE 2

High-performance liquid chromatography (HPLC) system parameters.

| Instrument | Parameter | Value | Unit |
| --- | --- | --- | --- |
| ELSD | Nebulizer Temp | 40.0 | °C. |
| Agilent | Evaporator Temp | 60.0 | °C. |
| 1260 Infinity | Gas Flow Rate | 1.60 | SLM |
| HPLC | Flow Rate | 0.75 | mL/min |
| Agilent | Column Temp | 35.0 | °C. |
| 1260 Infinity | Injection Volume | 75 | µL |
|  | Mobile Phase | 50:50 | Buffer:Water |
|  | Buffer (Ammonium Acetate) | 0.1 | M |
|  | Buffer pH | 9.5 | — |
| Column | Waters Ultrahydrogel 250, 6 µm, 7.8 mm × 300 mm | | |

Entrapment Efficiency of CMHEC by HPLC:

An Agilent 1260 Infinity HPLC with evaporative light scattering detector (ELSD) (Agilent Technologies, Santa Clara, Calif.) was chosen to study the EE of CMHEC in the nanoparticle mixture. The corresponding chromatographic size exclusion column (SEC) chosen for analyte separation was the Waters Ultrahydrogel 250 column (Waters Corporation, Milford, Mass.). This column was chosen because of its selectivity for polymers ranging from 1,000 to 80,000 Daltons, ideal for separating PAA from CMHEC.

Standards were prepared by creating alkaline solutions of CMHEC in deionized (DI) water followed by pH adjustment using 15 drops of ammonium hydroxide ($NH_4OH$) per 100 mL total solution. Samples were prepared for injection by accurately weighing 2-2.5 g of PEC suspension into a volumetric flask, adding 15 drops of $NH_4OH$, and diluting to volume with DI water. These solutions were all filtered using 0.45 µm syringe filters.

The EE is calculated as equation (1), $$\% EE = \frac{C_{tot} - C_{free}}{C_{tot}} * 100, \quad (1)$$

where $C_{tot}$ is the total concentration of CMHEC added to the system (given in Table 1), and $C_{free}$ is the amount of CMHEC not entrapped in a nanoparticle and is determined by equation (2).

$$C_{free} = \left(10^{\frac{Log\left(\frac{Peak\ Area}{B}\right)}{A}}\right) * \frac{D(mL)}{m(g)}, \quad (2)$$

where 'Peak Area' is the integrated area under the curve of the sample injection, in area counts; symbols 'A' and 'B' are fitting parameters determined from the calibration curve exhibiting a power law fit; 'm' is the measured mass of PEC sample added to the volumetric flask, in grams; and 'D' is the dilution factor; in this case 100 mL. Note, Equation (2) assumes a sample density of 1 g/mL, a reasonable assumption for these dilute aqueous suspensions.

Entrapment Efficiency of PEI by TN:

The EE of PEI was measured using the Total Nitrogen functionality of the Shimadzu TOC-L Analyzer (Shimadzu Corporation, Kyoto, Japan). Total PEI concentration ($C_{tot}$) was measured by injecting the homogeneous PEC mixture, and the free PEI ($C_{Free}$) was measured by injecting the supernatant of a centrifuged sample. The EE is similarly calculated from Equation (1).

Measurement of Particle Size and Zeta Potential by DLS Analyzer:

Particle size and zeta potential for the PEC nanoparticles were measured using the NanoBrook Omni DLS analyzer (Brookhaven Instruments Corporation, Holtsville, N.Y.). For particle size measurement, samples were prepared by diluting approximately 4 drops of sample in a cuvette to approximately 4 mL with DI water. For zeta potential measurement, 8 drops of samples were diluted to about 1.5 ml with 1 mM KCl. The mixtures were shaken and sonicated for several seconds to break up any flocculated particles. Measurements were taken at a scattering angle of 90° and a temperature of 25° C. Zeta potential was measured using the phase analysis light scattering (PALS) technique.

Cement Conditioning and Testing:

Cement slurries were prepared according to API recommended practices [27] and API specifications [28]. Slurries were mixed using the constant speed blender (OFI Testing Equipment, Houston, Tex.); and conditioned in an atmospheric consistometer for 30 minutes (Chandler Engineering, Houston, Tex.). Cement mixtures were then subjected to the following tests: static fluid loss using a high temperature high pressure filter press (OFI Testing Equipment, Houston, Tex.); plastic viscosity (PV), yield point (YP), and gel strength using the OFITE model 900 rotational viscometer (OFI Testing Equipment, Houston, Tex.); thickening time using the potentiometer built into the mixing cap of the consistometer; and free fluid test using a graduated cylinder and temperature controlled oven. Note: the thickening time was not performed strictly according to API requirements because the available consistometer is incapable of complying with the testing schedules set forth in the API specifications [28]. Instead, a thickening profile was obtained by measuring the consistency of the slurries over a five hour period at the desired testing temperature and atmospheric pressure.

Sample Slurry Preparation:

Slurries were prepared with varying amounts of PEC nanoparticle suspension. The amount of PEC used was based on the desired concentration of CMHEC in the final mixture. Unless otherwise stated, concentrations of components in cement slurries are measured on a "by weight of cement" basis (bwoc). Sample concentrations ranged from 0.1 wt % CMHEC as a PEC nanoparticle, to 0.3 wt % CMHEC as PEC. Table 3 describes the different sample and control mixtures used.

TABLE 3

Description of sample and control solutions.

| Mixture | Type | Sample Description |
|---|---|---|
| A | Sample | Primary PEC suspension comprised of CMHEC, PEI, and PAA |
| B | Control | PEC suspensions comprised of only PEI and PAA (no CMHEC present) |
| C | Control | PEI solution only (no CMHEC or PAA) |
| D | Control | PAA solution only (no CMHEC or PEI) |
| E | Control | Raw material CMHEC (no PEI or PAA in the slurry) |
| F | Control | PEC suspensions of PEI and PAA only with powdered CMHEC added to the dry cement (CMHEC present in slurry but not entrapped in the PEC) |
| G | Control | Normal PEC suspension (PEI/PAA/CMHEC) with additional powdered CMHEC added to the dry cement |
| H | Control | Commercially available, cellulose based FLA |

Results and Discussion: (Data Shown and Discussed Below were Obtained Using PEC Entrapping CMHEC)

PEC Characterization:

The nanoparticle system used in these experiments has a particle size of 144±1 nm and zeta potential of −23±1 mV. The EE of PEI, as determined by TN analysis, was found to be approximately 27.3%. With approximately one-fourth of the PEI entrapped, it is expected that the viscosity of the system would decrease while still providing a sufficient amount of free PEI to aid in fluid loss control and slurry stability. The calculated EE of CMHEC in the PEC sample was determined by HPLC to be 10.8% by mass. Although this value seems rather low, it does appear to be consistent with current understanding and observations. During sample preparation, cationic PEI and anionic PAA solutions are mixed first followed shortly by the anionic CMHEC polymer solution. Because PEC formation occurs rapidly, owing to the electrostatic interactions, it is very reasonable to assume that most of the active sites on PEI are consumed immediately upon addition of PAA. With very little positive charge left on the molecule, there is not much availability for CMHEC to react once it is added to the mixture. The cellulose molecules that do react are then expected to bind more loosely on the outside of the PEC core formed first between PEI and PAA (See FIG. 1). This logical assumption is also supported visually. During the initial PEC preparation step, with just the addition of PEI and PAA, the solution immediately becomes slightly cloudy or translucent. This visual cue is indicative of PEC formation. Upon addition of CMHEC, however, very little change is observed. In contrast, solutions formed between PEI and CMHEC alone result in the formation of a thick, heavy aggregate. This further suggests that little CMHEC is being entrapped in the nanoparticle complex. Despite the low EE, however, it is shown below that this small amount of entrapped CMHEC results in a significant increase in fluid loss control. A comprehensive discussion on the rheology and stability of the PEC system is provided in their respective sections below.

Figure 2A:
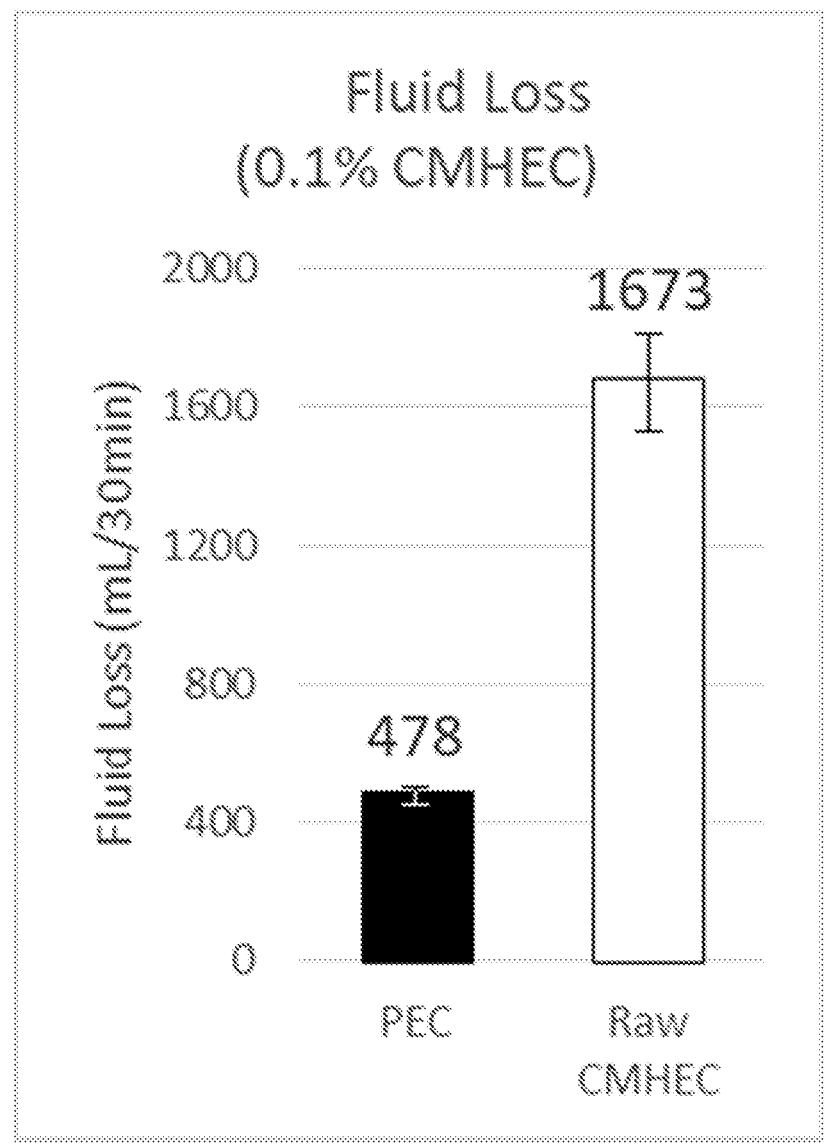
FIGS. 2A-2C are bar graphs comparing fluid loss results between polyelectrolyte complexes (PEC) nanoparticles and raw carboxymethyl hydroxyethyl cellulose (CMHEC) for the 0.1 wt % (FIG. 2A), 0.2 wt % (FIG. 2B), and 0.3 wt % (FIG. 2C) CMHEC. All percentages are percentages by weight.
Figure 2B:
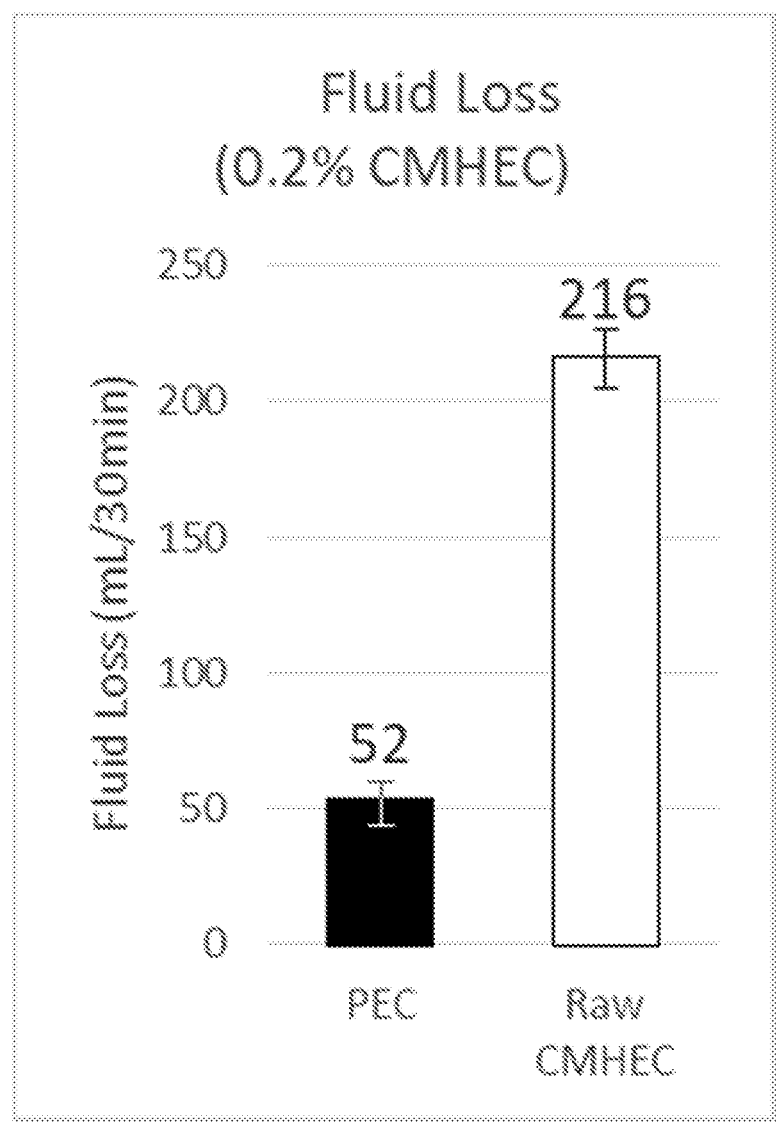
Figure 2C:
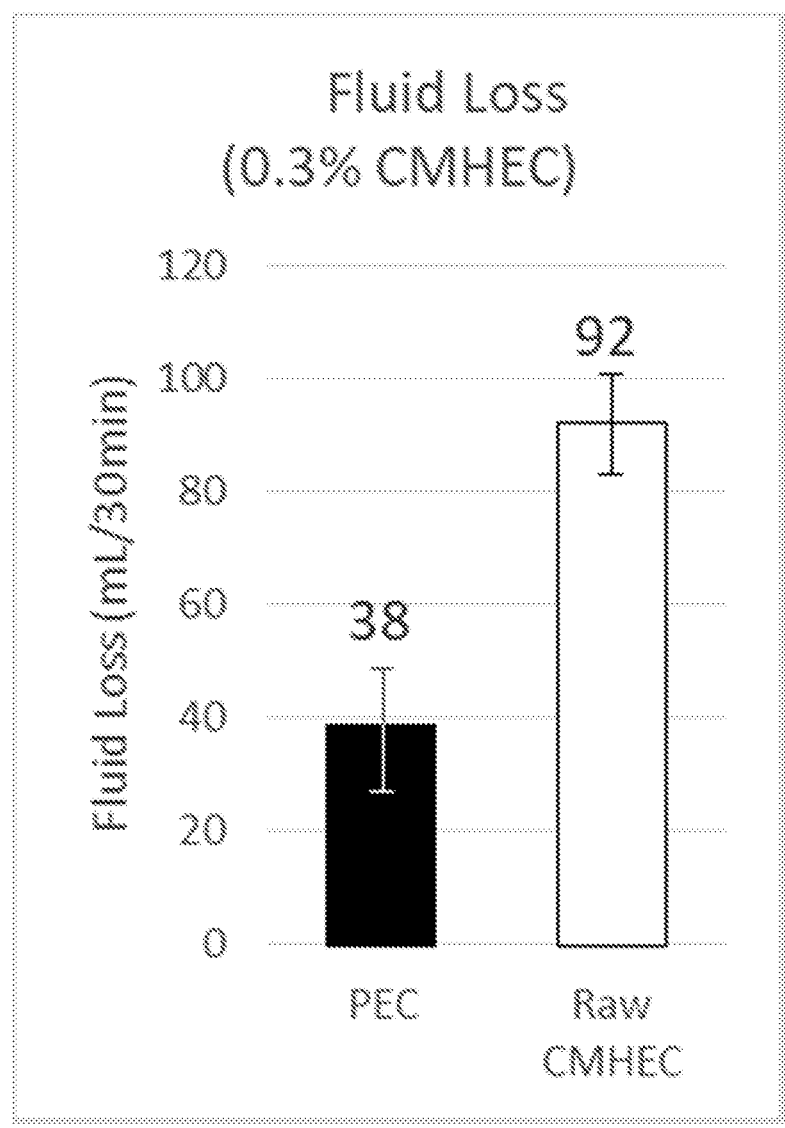

Cement Slurry Characterization:

Static Fluid Loss:

Results for fluid loss tests performed at 40° C. are shown in Table 4. A summary of the results for cases of 0.1 wt %, 0.2 wt % and 0.3 wt % CMHEC as a PEC and as raw material are given in FIG. 2A, FIG. 2B, and FIG. 2C, respectively. In every instance, the PEC achieves significantly better control over the raw material although it contains the same amount of primary fluid loss additive, CMHEC. This is especially convincing considering PEI (Test #1), PAA (Test #2), and combinations of the two (Test #3) provide effectively no control on their own under these conditions. At just 0.3 wt % CMHEC, the fluid loss of the nanoparticle system is only 38±11 mL/30 minutes. This means that it is about twice as effective at controlling fluid loss as the raw material alone. In order for the raw material to achieve the same control, it would require a concentration of approximately 0.5 wt % (Test #15). Furthermore, only 0.15 wt % of CMHEC as a PEC (Test #6) was required to achieve acceptable API fluid loss compared to the 0.3 wt % required of the raw material (Tests #12). This is very significant as the PEC system demonstrates a potential 50% reduction in amount of CMHEC FLA required to meet the industry standard.

TABLE 4

Static fluid loss test results at 40° C.

| Test # | Solution | wt % CMHEC (bwoc) | wt % PEI (bwoc) | wt % PAA (bwoc) | API Fluid Loss (mL/30 min) | # of test | Filter cake thickness (cm) | CHMEC in PEC? |
|---|---|---|---|---|---|---|---|---|
| 1 | C | — | 0.3 | — | 1320 ± 134 | 1 | ND | — |
| 2 | D | — | — | 0.3 | 1850 ± 188 | 1 | ND | — |
| 3 | B | — | 0.36 | 0.18 | 863 ± 109 | 1 | ND | — |
| 4 | A | 0.1 | 0.18 | 0.09 | 478 ± 25 | 1 | ND | Y |
| 5 | E | 0.1 | — | — | 1673 ± 143 | 1 | ND | — |
| 6 | A | 0.15 | 0.27 | 0.135 | 91 ± 9 | 1 | 2 | Y |
| 7 | A | 0.2 | 0.36 | 0.18 | 52 ± 8 | 1 | 2.3 | Y |
| 8 | F | 0.2 | 0.36 | 0.18 | 235 ± 3.5 | 2 | ND | — |
| 9 | E | 0.2 | — | — | 216 ± 11 | 2 | ND | — |
| 10 | E | 0.25 | — | — | 169 ± 17 | 1 | ND | — |
| 11 | A | 0.3 | 0.54 | 0.27 | 38 ± 11 | 2 | 2.3 ± 0.8 | Y |
| 12 | E | 0.3 | — | — | 92 ± 9 | 2 | 3.2 ± 0.1 | — |
| 13 | E | 0.35 | — | — | 72 ± 7 | 1 | 4.2 | — |

TABLE 4-continued

Static fluid loss test results at 40° C.

| Test # | Solution | wt % CMHEC (bwoc) | wt % PEI (bwoc) | wt % PAA (bwoc) | API Fluid Loss (mL/30 min) | # of test | Filter cake thickness (cm) | CHMEC in PEC? |
|---|---|---|---|---|---|---|---|---|
| 14 | E | 0.4 | — | — | 48 ± 7 | 2 | 3.0 ± 0.3 | — |
| 15 | E | 0.5 | — | — | 32 ± 5 | 2 | 2.4 ± 0.2 | — |
| 16 (H-9) | H | — | — | — | 26 ± 4 | 1 | 1.8 | — |

Y = Yes, CMHEC entrapped in PEC; H-9 is a FLA commercial product of Halliburton.; ND means not distinguishable because all of the slurry has hardened and became a large piece after the test.

TABLE 5

Static fluid loss test results at 65° C.

| Test # | Mixture | wt % CMHEC (bwoc) | wt % PEI (bwoc) | wt % PAA (bwoc) | CHMEC in PEC? | Fluid Loss (mL/30 min) |
|---|---|---|---|---|---|---|
| 16 | A | 0.3 | 0.54 | 0.27 | X | 165 ± 17 |
| 17 | E | 0.3 | — | — | — | 148 ± 15 |
| 18 | G | 0.3 | 0.36 | 0.18 | X | 162 ± 16 |
| 19 | G | 0.4 | 0.54 | 0.27 | X | 92 ± 9 |
| 20 | E | 0.4 | — | — | — | 88 ± 9 |

Figure 3:
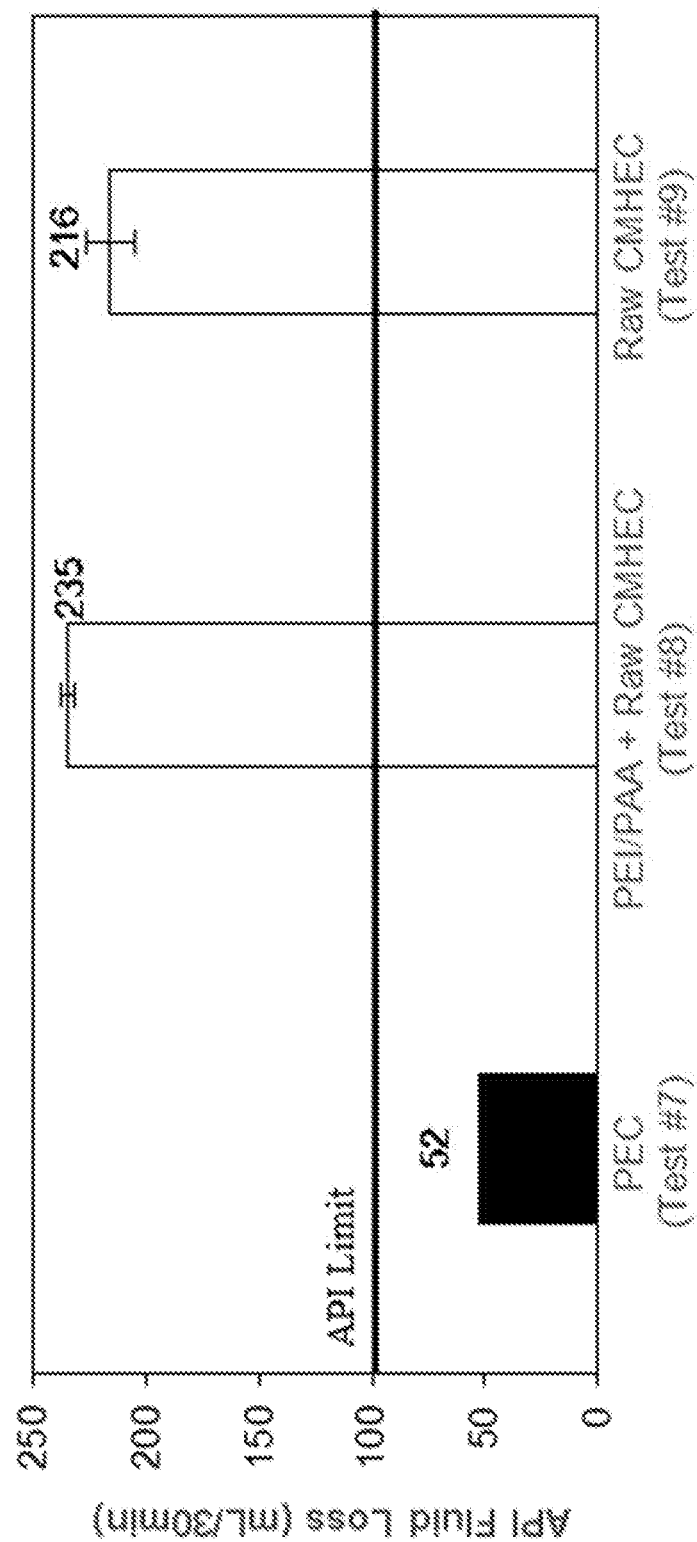
FIG. 3 is a bar graph comparing fluid loss of various mixtures containing 0.2 wt % CMHEC. All percentages are percentages by weight.

To verify that the PEC-entrapping-CMHEC provides the control and not just a combination of these three components, another control test was devised (Mixture F). In this test (Test #8), the CMHEC was not included as a component of the PEC yet was still added to the slurry at 0.2 wt % bwoc. The liquid portion of the slurry was comprised of the appropriate amounts of PEI and PAA. Instead of being trapped in a nanoparticle, however, the 0.2 wt % CMHEC was dispersed in the dry cement mixture. This ensured that all polymers existed in the slurry in their appropriate ratios but reduced the probability of CMHEC being entrapped. The results from this test were then compared to 0.2 wt % CMHEC as PEC and 0.2 wt % CMHEC as raw material. The findings are summarized in FIG. 3. In this case, the PEC performed over three times better than the control tests (Test #8 & 9). This provides strong evidence that the developed PEC system, with entrapped CMHEC, is indeed responsible for providing the excellent fluid loss capabilities observed.

Figure 4:
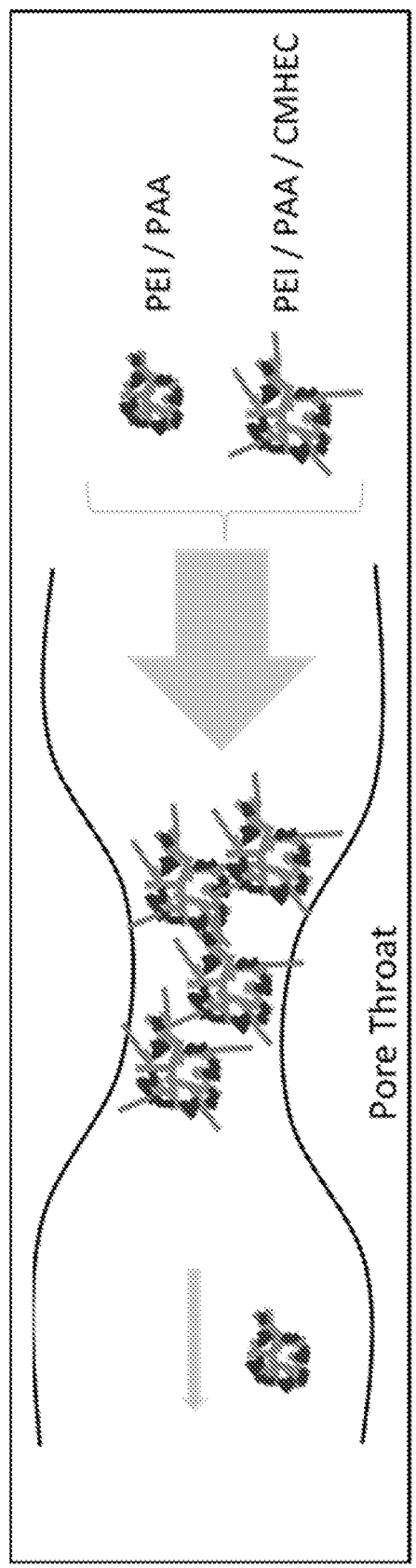
FIG. 4 is a schematic of polyelectrolyte complexes (PEC) nanoparticle pore plugging in filter cake during fluid loss test.

As discussed, essentially the only difference between Test #7 and Test #8 is whether the CMHEC is entrapped in a PEC or whether it is free in solution. The question looming is, how can the entrapped CMHEC provide such superior control when only 11% is entrapped? The proposed answer lies in the structural characteristics of cellulose. Cellulose is made up of repeating glucose units attached through β (1, 4)-linkages. This bond prevents the units from rotating causing cellulose polymers to be linear and non-branching. This means that CMHEC is expected to protrude outward from the center when added to the nanoparticle as shown in FIG. 1. The increase in hydrodynamic radius, as discussed earlier, adds credibility to this theory. Finally, since CMHEC is known to bind to the pores in the filter cake [23], the protruding ends help the complex embed in the openings causing an efficient plug to form, as shown in FIG. 4 below.

Cement rheology was also studied alongside the fluid loss tests at both 40° C. Table 6 summarizes the important data relating to PV, YP, 10 second gel strength, and 10 minute gel strength tests at this temperature.

TABLE 6

Rheology test results at 40° C.

| Test # | wt % CMHEC | wt % PEI | wt % PAA | CHMEC in PEC? | PV* (CP) | YP* (dyne/cm2) | 10s Gel* (dyne/cm2) | 10m Gel* (dyne/cm2) |
|---|---|---|---|---|---|---|---|---|
| 1 | 0 | 0.3 | — | — | 123.8 | 184.7 | 104 | 116 |
| 2 | 0 | — | 0.3 | — | 27.2 | 14.3 | 17 | 24 |
| 3 | 0 | 0.36 | 0.18 | — | 83.1 | 137.0 | 93 | 211 |
| 4 | 0.1 | 0.18 | 0.09 | X | 68.1 | 59.0 | 47 | 102 |
| 5 | 0.1 | — | — | — | 58.4 | 98.9 | 63 | 88 |
| 6 | 0.15 | 0.27 | 0.135 | X | 101.8 | 43.3 | 31 | 130 |
| 7 | 0.2 | 0.36 | 0.18 | X | 118.0 | 1.8 | 4 | 25 |
| 8 | 0.2 | 0.36 | 0.18 | — | 136.2 | 18.5 | 20 | 52 |
| 9 | 0.2 | — | — | — | 69.1 | 0.0 | 0 | 15 |
| 10 | 0.25 | — | — | — | 83.7 | 25.7 | 23 | 105 |
| 11 | 0.3 | 0.54 | 0.27 | X | 241.9 | 46.4 | 28 | 88 |
| 12 | 0.3 | — | — | — | 115.3 | 4.1 | 8 | 34.5 |
| 13 | 0.35 | — | — | — | 145.5 | 2.1 | 11 | 61 |
| 14 | 0.4 | — | — | — | 164.8 | 18.9 | 18 | 72 |
| 15 | 0.5 | — | — | — | 307.5 | 75.6 | 36 | 50 |
| 16 (H-9) | — | — | — | — | 267.7 | 835.2 | 314 | 587 |

*Note:
1 cP = 1 Pa*s; 1 dyne/cm2 = 0.1 Pa; H-9 is a FLA commercial product of Halliburton.

Figure 5:
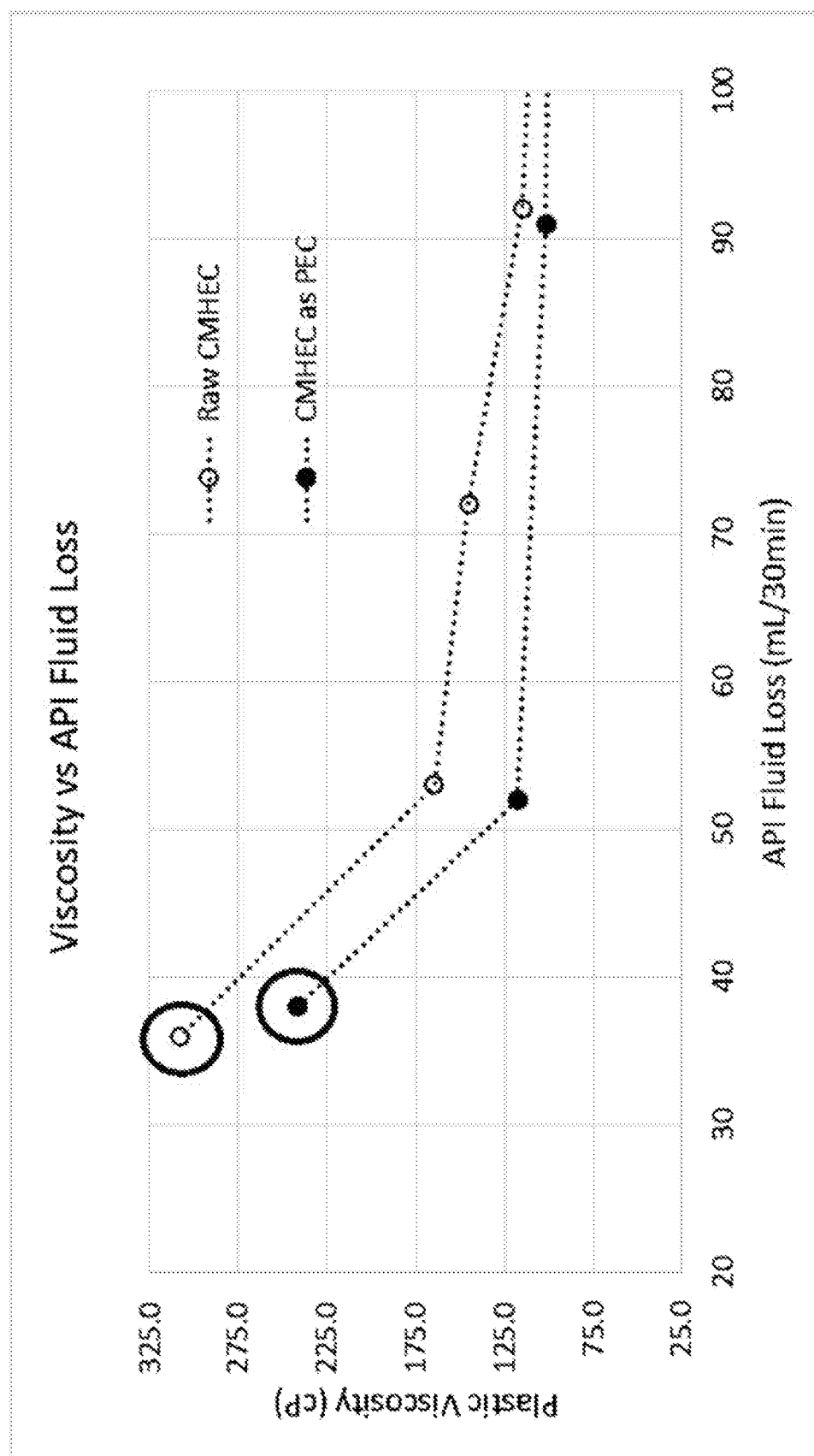
FIG. 5 is a graph of the plastic viscosity (cP) vs American Petroleum Institute (API) fluid loss (mL/30 min) for carboxymethyl hydroxyethyl cellulose (CMHEC) as polyelectrolyte complexes (PEC) nanoparticles and raw material.

For a visual representation, data for both CMHEC as PEC and for powdered CMHEC were plotted on a graph with respect to API fluid loss of the system. This is shown in FIG. 5. As observed, the PEC's PV is below that of the raw material across the entire acceptable API range. Perhaps the most significant difference is seen when comparing the best recorded fluid loss value of each system. Even though the PEC achieves approximately the same fluid loss control as the raw material, its viscosity is approximately 20% lower. This means that the PEC provides nearly the same fluid loss control while being easier to pump than the baseline case of CMHEC as raw material.

Figure 8:
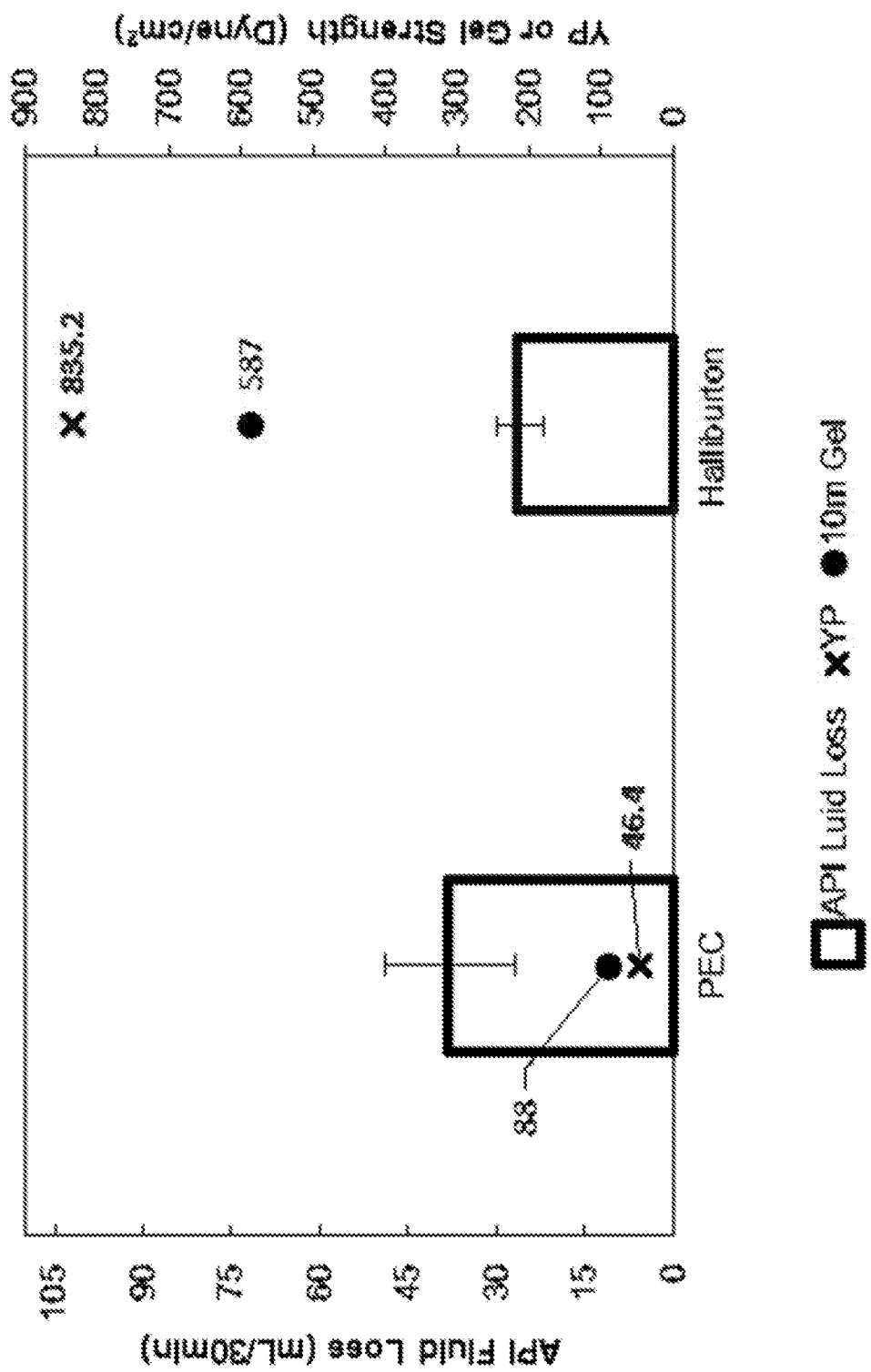
FIG. 8 is a graph comparing the polyelectrolyte complex (PEC) nanoparticles (0.3 wt % carboxymethyl hydroxyethyl cellulose (CMHEC)) to Halliburton fluid loss control additives (FLA) commercial product, H-9. Both samples contained 1.1 wt % total additives. The American Petroleum Institute (API) fluid loss limit is 100 ml/30 min. The X represents the data of yield point (YP); the circles represents for the data of 10 min gel strength.

To provide another point of evaluation, the PEC nanoparticle system was compared against the commercially available FLA from Halliburton. In this case, 1.0 wt % of the material was used with a small amount (0.1 wt %) of a lignosulfonate retarder for a sum of 1.1% bwoc total additives. This is comparable to the case of 0.3 wt % CMHEC as PEC that also has 1.1 wt % bwoc total additives (see FIG. 8).

Although both systems are comparable with respect to fluid loss control, when it comes to rheological properties, the PEC excels. At just 242 cP, the plastic viscosity of slurry containing PECs was approximately 10% lower than with the commercial product (PV=268 cP). Furthermore, the commercial FLA from Halliburton, with a YP of over 835 dyne/cm$^2$ (or 84 Pa), might be too high to be considered pumpable (See FIG. 8).[5, 23, 33, 34]. In real life situations, dispersants may need to be added to lower the YP of the commercial slurry. However, this means purchasing more expensive additives. On the other hand, with a YP of only 46.4 dyne/cm$^2$ (4.64 Pa), the PEC system is within a much more normal range. With respect to gel strength, the commercial slurry gelled very rapidly (10 minute gel strength equals 587 dyne/cm$^2$) and would therefore be prone to bridging and fluid communication. For the PEC system, on the other hand, the 10 minute gel strength was a reasonable 88 dyne/cm$^2$ (8.8 Pa), within the recommended criteria for a stable slurry [29] It must still be remembered that the gel strengths reported here are not the same as results from API's static-gel-strength tests from which the recommended criteria were derived. The final determination on slurry stability will come from the results of the free fluid test.

TABLE 7

Comparison of PEC system vs commercial system.

| FLA | FLA (mL/30 min) | PV* (cP) | YP* (dyne/cm$^2$) | 10 s Gel* (dyne/cm$^2$) | 10 m Gel* (dyne/cm$^2$) |
| --- | --- | --- | --- | --- | --- |
| PEG | 38 | 242 | 46 | 28 | 88 |
| Halad-9 | 26 | 268 | 835 | 314 | 587 |

*Note:
1 cP = 1 Pa*s;
1 dyne/cm$^2$ = 0.1 Pa

With respect to gel strength, the commercial slurry gelled very rapidly and would therefore be prone to bridging and fluid communication. For the PEC system, on the other hand, the 10 minute gel strength was a reasonable 88 dyne/cm$^2$ (8.8 Pa), within the recommended criteria for a stable slurry [29]. It must still be remembered that the gel strengths reported here are not the same as results from API's static-gel-strength test from which the recommended criteria were derived. The final determination on slurry stability will come from the results of the free fluid test.

To demonstrate the ability of the PEC to improve slurry viscosity by entrapping FLAs, compare Test #7 to Test #8 from Table 6. Both tests were performed with the same amount of reagents. Test #7, however, included CMHEC entrapped in the PEC whereas Test #8 did not. Notice that by simply entrapping CMHEC, the PV of the slurry decreases from 136.2 cP to 118 cP. This demonstrates that viscosity can be effectively controlled by entrapping the FLA in a nanoparticle.

Free-Fluid Test:

The free fluid test at 40° C. produced the following data, presented in Table 8. Although API has stipulated that no more than 5.9% free fluid is acceptable [28], many argue that more than a trace is undesirable [30, 31]. For slurries containing CMHEC, the free fluid development was well within acceptable criteria and is consistent with literature [32]. Furthermore, the PEC system even showed an improvement over the raw material case with no measureable quantity of free fluid.

TABLE 8

API Free fluid test data.

| Slurry | Mixture | Free Fluid (vol %) |
| --- | --- | --- |
| H-Cement only, no additive | | 1 |
| H-Cement + 0.3 wt % CMHEC | E | 0.1 |
| H-Cement + 0.3 wt % CMHEC as PEC | A | 0 |

Figure 6:
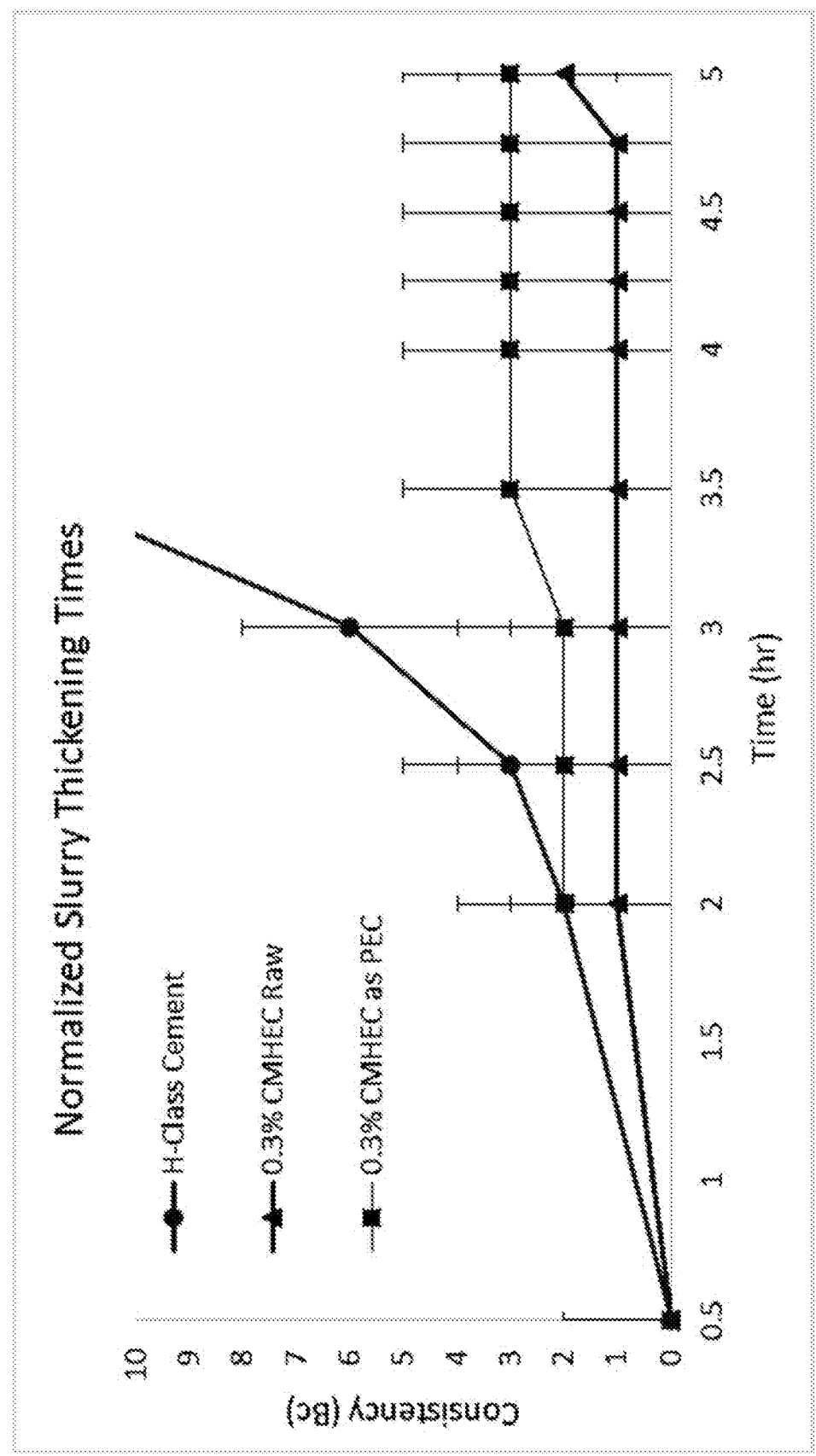
FIG. 6 is a graph of the normalized slurry thickening times plotted as normalized consistency (Bc) as a function of time (hours). The consistency is normalized to zero at a conditioning time of 0.5 hours, which is the typical amount of time required for the slurry to reach temperature equilibrium.

Thickening Time:

Thickening time results for 40° C. temperatures are given in Table 9 and normalized values are represented graphically in FIG. 6. Not surprisingly, the slurries that contained CMHEC and/or PAA demonstrated much higher retarding effects than H-Class cement alone. This was expected as both components, by virtue of their carboxyl groups, are known to be effective retarders for cement. While a degree of retardation can be beneficial, especially given high reservoir temperatures, excessive retardation significantly increase the "waiting on cement" time at a well site and may lead to slurry instability.

TABLE 9

Thickening profiles in 5 hours at 40° C. and atmospheric pressure.

| | | Time (hours) | | | | | | | | | |
| --- | --- | --- | --- | --- | --- | --- | --- | --- | --- | --- | --- |
| | | 0 | 0.5 | 2 | 2.5 | 3 | 3.5 | 4 | 4.3 | 4.5 | 4.8 | 5 |
| Sample | Mixture | Thickening Time (±2 Bc) | | | | | | | | | |
| H-Class Cement | | 8 | 12 | 14 | 15 | 18 | 24 | 31 | 36 | 40 | 46 | 53 |
| 0.3 wt % CMHEC | E | 6 | 5 | 6 | 6 | 6 | 6 | 6 | 6 | 6 | 6 | 7 |
| PEC | A | 10 | 11 | 13 | 13 | 13 | 14 | 14 | 14 | 14 | 14 | 14 |

For 0.3 wt % CMHEC as raw material, the slurry showed very little increase in consistency even after 5 hours of conditioning. On the other hand, the trend of the PEC system resembles that of H-Class cement for the first 2 hours of testing before tapering off to a nearly level value resembling that of the raw material after approximately 3.5 hours (FIG. 6).

The observed trend indicates that at least some of the polymers are entrapped in a nanoparticle up to approximately 2 hours. After this time, the PECs appear to degrade slowly up until approximately 3.5 hours. This results in a release of more retarding agents to the system, specifically CMHEC and PAA, leading to a more retarded system after approximately 3.5 hours than was observed initially. Although this data alone is hardly conclusive, it does add further credence to the possibility of applying a delayed release mechanism to control and alter the rheological properties of a cement slurry after placement. More experiments would need to be performed to quantitate the rate of PEC degradation to confirm this observation.

To provide additional insight, the effects of varying the PEI concentration were tested. The results are presented in Table 10. The results demonstrate that, at 40° C., reducing PEI concentration reduced fluid loss control. At 65° C., fluid loss control can be improved by reducing PEI concentration.

TABLE 10

Comparison of fluid loss control and rheological properties for fluid loss control compositions including varying amounts of PEI.

| Temp. | slurry composition | API fluid loss (ml/30 min) | PV (best) (cp) | YP (best) (dyne/cm$^2$) | gel 1 (dyne/cm$^2$) | gel 2 (dyne/cm$^2$) |
|---|---|---|---|---|---|---|
| 40° C. | 0.3 wt % CMHEC | 108 | 109.29 | 0 | 8 | 52 |
|  | 0.3 wt % CMHEC + 0.5 wt % PEI25k as PEI25k/PAA-Cr-14 PEC | 40 | 139.84 | 2.48 | 11 | 20 |
|  | 0.3 wt % CMHEC + 0.3 wt % PEI25k as PEI25k/PAA-Cr-14 PEC | 56 | 115.367 | 0 | 9 | 23 |
| 65° C. | 0.4 wt % CMHEC | 88 | 93.68 | 15.996 | 17 | 94 |
|  | 0.4 wt % CMHEC + 0.5 wt % PEI as PEI25k/PAA-Cr-14 PEC | 71 | 104.459 | 33.144 | 29 | 190 |
|  | 0.4 wt % CMHEC + 0.3 wt % PEI as PEI25k/PAA-Cr-14 PEC | 64 | 89.425 | 14.015 | 11 | 106 |

Finally, the fluid loss control and rheological properties of various compositions were examined at 40° C. The results are provided in Table 11, demonstrating that both positively (PEC) and negatively (NPEC) charged PEC are proven to improve fluid loss control at 40° C.

TABLE 11

Fluid loss control and rheological properties of fluid loss control compositions including varying slurry additives at 40° C.

| slurry additives | API fluid loss (ml/30 min) | PV (cp) | YP (dyne/cm$^2$) | 10 s gel strength (dyne/cm$^2$) | 10 min gel strength (dyne/cm$^2$) |
|---|---|---|---|---|---|
| 0.3 wt % CMHEC | 108 | 109.3 | 0 | 8 | 52 |
| 0.3 wt % CMHEC as PEI2000k/PAA-CMHEC-18 PEC | 38 | 229.6 | 13.96 | 17 | 46 |
| 0.3 wt % CMHEC + 0.5 wt % PEI25k as PEI25k/PAA-16 PEC | 56 | 140.3 | 13.42 | 13 | 38 |
| 0.3 wt % CMHEC + 0.5 wt % PEI25k as PEI25k/PAA-Cr-14 PEC | 40 | 139.8 | 2.48 | 11 | 20 |
| 0.3 wt % CMHEC + 0.08 wt % PEI800 as PEI800/PPVS-Cr-21 PEC | 86 | 71.66 | 6.055 | 4 | 29 |
| 0.3 wt % CMHEC + 0.2 wt % PEI25k as PEI25k/PAA-Cr-35 NPEC | 39 | 155.6 | 0 | 8 | 15 |

CONCLUSIONS

This work demonstrated that a nanoparticle system comprised of CMHEC, PEI, and PAA could be added to a cement slurry to achieve a fluid loss of only 38 mL/30 min at 40° C. with only 0.3 wt % bwoc CMHEC as a PEC. This is over twice as effective as CMHEC alone and is comparable to a commercial product using the same total mass of additives. Furthermore, this PEC produced plastic viscosities across the entire acceptable range that were lower than control samples achieving the same fluid loss. These particles also met all API requirements for the tests in which they were subjected.

The results demonstrate that PEC nanoparticles can be formed using common polymers already used in the oil well cementing industry, specifically CMHEC, PEI, and PAA. Such PEC systems provide exceptional fluid loss control at 40° C. In addition to fluid loss control, the nanoparticle slurry system can maintain reasonable plastic viscosity, stability, and gel strength development as demonstrated by the fact that all values remained within API specifications (where applicable). By entrapping FLAs in a PEC, the plastic viscosity of the system can be reduced. Importantly, this plastic viscosity reduction does not result in a decrease in fluid loss control.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure.

All such modifications and variations are intended to be included herein within the scope of this disclosure.

REFERENCES

[1] M. J. Rogers, R. L. Dillenbeck, R. N. Eid, Transition time of cement slurries, definitions and misconceptions, related to annular fluid migration, SPE Annual Technical Conference and Exhibition, Society of Petroleum Engineers, 2004.

[2] E. F. Lucas, C. R. Mansur, L. Spinelli, Y. G. Queirós, Polymer science applied to petroleum production, Pure and Applied Chemistry, 81 (2009) 473-494.

[3] S. Pelipenko, I. Frigaard, Mud removal and cement placement during primary cementing of an oil well—Part 2; steady-state displacements, Journal of Engineering Mathematics, 48 (2004) 1-26.

[4] S. Bittleston, J. Ferguson, I. Frigaard, Mud removal and cement placement during primary cementing of an oil well—Laminar non-Newtonian displacements in an eccentric annular Hele-Shaw cell, Journal of Engineering Mathematics, 43 (2002) 229-253.

[5] S. Bittleston, D. Guillot, Mud removal: research improves traditional cementing guidelines, Oilfield Review, 3 (1991) 44-54.

[6] G. E. King, An Introduction to the Basics of Well Completions, Stimulations and Workovers, Tulsa, Okla., 1998.

[7] C. Greaves, A. Hibbert, Test improves measurement of cement-slurry stability, Oil and Gas Journal; (USA), 88 (1990).

[8] R. Gandelman, C. Miranda, K. Teixeira, A. L. Martins, A. Waldmann, On the rheological parameters governing oilwell cement slurry stability, Annual transactions of the nordic rheology society, 12 (2004) 85-91.

[9] S. Crema, C. Kucera, G. Konrad, New Fluid-Loss Additives for Oilfield Cementing, SPE Production Operations Symposium, Society of Petroleum Engineers, 1989.

[10] R. B. Jackson, The integrity of oil and gas wells, Proceedings of the National Academy of Sciences, 111 (2014) 10902-10903.

[11] R. D. Vidic, S. L. Brantley, J. M. Vandenbossche, D. Yoxtheimer, J. D. Abad, Impact of shale gas development on regional water quality, Science, 340 (2013) 1235009.

[12] R. J. Davies, S. Almond, R. S. Ward, R. B. Jackson, C. Adams, F. Worrall, L. G. Herringshaw, J. G. Gluyas, M. A. Whitehead, Oil and gas wells and their integrity: Implications for shale and unconventional resource exploitation, Marine and Petroleum Geology, 56 (2014) 239-254.

[13] S. Gubbala, Polyelectrolyte complex: a pharmaceutical review, Int J Pharm Biol Sci, 2 (2012) 399-407.

[14] S. Lankalapalli, V. M. Kolapalli, Polyelectrolyte complexes: A review of their applicability in drug delivery technology, Indian journal of pharmaceutical sciences, 71 (2009) 481.

[15] R. Barati, S. J. Johnson, S. McCool, D. W. Green, G. P. Willhite, J. T. Liang, Fracturing fluid cleanup by controlled release of enzymes from polyelectrolyte complex nanoparticles, Journal of Applied Polymer Science, 121 (2011) 1292-1298.

[16] R. Barati, S. J. Johnson, S. McCool, D. W. Green, G. P. Willhite, J. T. Liang, Polyelectrolyte complex nanoparticles for protection and delayed release of enzymes in alkaline pH and at elevated temperature during hydraulic fracturing of oil wells, Journal of Applied Polymer Science, 126 (2012) 587-592.

[17] M. Cordova, M. Cheng, J. Trejo, S. J. Johnson, G. P. Willhite, J.-T. Liang, C. Berkland, Delayed HPAM gelation via transient sequestration of chromium in polyelectrolyte complex nanoparticles, Macromolecules, 41 (2008) 4398-4404.

[18] Y. Y. Lin, C. Berkland, J. T. Liang, A. Moradi-Araghi, T. M. Christian, R. B. Needham, J. H. Hedges, M. Cheng, F. L. Scully, D. R. Zornes, Delayed gelling agents, Patent Application Publication USA, 2014.

[19] S. Johnson, C. Berkland, A. Moradi-Araghi, J. T. Liang, T. M. Christian, R. B. Needham, M. Cheng, Y. Y. Lin, A. B. Woodside, Low molecular weight polyacrylates for EOR, Patent Application Publication USA, 2016.

[20] J. Chatterji, D. C. Brenneis, G. R. Hundt, Encapsulated Fluid-Loss Additives for Cement Compositions, Google Patents, 2014.

[21] F. Dugonjić-Bilić, J. Plank, Polyelectrolyte complexes from polyethylene imine/acetone formaldehyde sulfite polycondensates: a novel reagent for effective fluid loss control of oil well cement slurries, Journal of Applied Polymer Science, 121 (2011) 1262-1275.

[22] J. Plank, N. R. Lummer, F. Dugonjic-Bilic, D. Sadasivan, Comparative Study of the Working Mechanisms of Different Cement Fluid Loss Polymers, SPE International Symposium on Oilfield Chemistry, Society of Petroleum Engineers, 2009.

[23] D. Bülichen, J. Plank, Mechanistic study on carboxymethyl hydroxyethyl cellulose as fluid loss control additive in oil well cement, Journal of Applied Polymer Science, 124 (2012) 2340-2347.

[24] E. B. Nelson, Well Cementing, Schlumberger Educational Services 2009.

[25] L. F. McKenzie, P. M. McElfresh, Acrylamide/acrylic acid copolymers for cement fluid loss control, SPE Oilfield and Geothermal Chemistry Symposium, Society of Petroleum Engineers, 1982.

[26] P. J. Lea, Low water-loss cement slurry, Google Patents, 1952.

[27] API_10B-2, Recommended Practice for Testing Well Cements, API, Washington, D.C., 2013.

[28] API_Specification_10A, Specifications for Cements and Materials for Well Cementing, API, Washington, D.C., 2010.

[29] J.-F. Baret, S. Leroy-Delage, B. Dargaud, Cementing compositions and use of such compositions for cementing oil wells or the like, Google Patents, 2002.

[30] R. Salehi, A. M. Paiaman, A novel cement slurry design applicable to horizontal well conditions, Petroleum & Coal, 51 (2009) 270-276.

[31] S. Devereux, Practical well planning and drilling manual, PennWell Books 1998.

[32] H. Roshan, M. Asef, Characteristics of oilwell cement slurry using CMC, SPE Drilling & Completion, 25 (2010) 328-335.

[33] Mai, C. T., Kadri, E. H., Ngo, T. T. et al. 2014, Estimation of the Pumping Pressure from Concrete Composition Based on the Identified Tribological Parameters. Advances in Materials Science and Engineering 2014: 18 pages.

[34] Clark, P. E., Sundaram, L., and Balakrishnan, M. 1990. Yield Points in Oilfield Cement Slurries. Presented at SPE Eastern Regional Meeting, 31 October-2 November, Columbus, Ohio. SPE-21279-MS.

The present disclosure will be better understood upon review of the following features, which should not be confused with the claims.

Feature 1. A fluid loss control composition comprising polyelectrolyte complex nanoparticles formed of at least the following components: (i) a polycation polymer, and (ii) a polyanion polymer.

Feature 2. The fluid loss control composition according to any one of Features 1-17, wherein the polyelectrolyte complex nanoparticles further comprise (iii) a fluid loss additive.

Feature 3. The fluid loss control composition according to any one of Features 1-17, wherein the fluid loss additive is a cellulose polymer.

Feature 4. The fluid loss control composition according to any one of Features 1-17, wherein the cellulose polymer is carboxymethyl hydroxyethyl cellulose.

Feature 5. The fluid loss control composition according to any one of Features 1-17, wherein the carboxymethyl hydroxyethyl cellulose has a molecular weight of about 60 kDa to about 100 kDa.

Feature 6. The fluid loss control composition according to any one of Features 1-17, wherein the fluid loss control composition further comprises a plurality of metal ions.

Feature 7. The fluid loss control composition according to any one of Features 1-17, wherein the plurality metal ions comprise chromium ions, zirconium, titanium, aluminum ions, or a combination thereof.

Feature 8. The fluid loss control composition according to any one of Features 1-17, wherein the polycation polymer comprises a plurality of amine functional groups.

Feature 9. The fluid loss control composition according to any one of Features 1-17, wherein the polycation polymer has a molecular weight of about 800 Da to about 2500 kDa.

Feature 10. The fluid loss control composition according to any one of Features 1-17, wherein the polycation polymer is a branched chain polymer.

Feature 11. The fluid loss control composition according to any one of Features 1-17, wherein the polycation polymer is a polyethylenimine.

Feature 12. The fluid loss control composition according to any one of Features 1-17, wherein the polyanion polymer comprises a plurality of carboxylic acid or sulfonic acid functional groups.

Feature 13. The fluid loss control composition according to any one of Features 1-17, wherein the polyanion polymer has a molecular weight of about 4000 Da to about 20 kDa.

Feature 14. The fluid loss control composition according to any one of Features 1-17, wherein the polyanion polymer is polyacrylic acid or poly(vinylsulfonic) acid.

Feature 15. The fluid loss control composition according to any one of Features 1-17, wherein the polyelectrolyte complex nanoparticles have an average diameter of about 100 nm to about 2 microns.

Feature 16. The fluid loss control composition according to any one of Features 1-17, wherein the polyelectrolyte complex nanoparticles have an average diameter of about 100 nm to about 600 nm.

Feature 17. The fluid loss control composition according to any one of Features 1-16, wherein at least 60% of the polyelectrolyte complex nanoparticles are stable for a period of at least 2 days, 5 days, or 7 days at a temperature of about 150° C., about 65° C., or about 40° C.

Feature 18. A method of fluid loss control in a cementing operation, the method comprising adding an effective amount of a composition according to any one of Features 1-17 to a cement slurry.

Feature 19. A method of making a fluid loss control composition according to any one of Features 1-17, the method comprising (i) mixing the polycation polymer along with any additives, if present, to form a first mixture; and (ii) adding the polyanion polymer to the first mixture to form the fluid loss control composition comprising the polyelectrolyte complex nanoparticles.

Feature 20. The method according to Feature 19, wherein the additives comprise one or more metal ions, one or more fluid loss additives, or a combination thereof.

Feature 21. A method of preparing a slurry composition for controlling fluid loss in a cementing operation, the method comprising: preparing a slurry comprising polyelectrolyte complex nanoparticles as described herein, and adding an amount of a fluid loss additive to the slurry.

Feature 22. A method of preparing a slurry composition for controlling fluid loss in a cementing operation, the method comprising: dry blending a fluid loss additive powder and a dry cement powder to create a dry mixture; adding the dry mixture to a suspension containing polyelectrolyte complex nanoparticles as described herein in water to form the slurry.

Feature 23. The method according to any one of Features 21-31, wherein the polyelectrolyte complex nanoparticles comprise: (i) a polycation polymer, and (ii) a polyanion polymer.

Feature 24. The method according to any one of Features 21-31, wherein the polycation polymer is a branched chain polymer.

Feature 25. The method according to any one of Features 21-31, wherein the polycation polymer is a polyethylenimine.

Feature 26. The method according to any one of Features 21-31, wherein the polyanion polymer comprises a plurality of carboxylic acid or sulfonic functional groups.

Feature 27. The method according to any one of Features 21-31, wherein the polyanion polymer has a molecule weight of about 4000 Da to about 20 kDa.

Feature 28. The method according to any one of Features 21-31, wherein the polyanion polymer is polyacrylic acid or poly(vinylsulfonic) acid.

Feature 29. The method according to any one of Features 21-31, wherein the polyelectrolyte complex nanoparticles have an average diameter of about 100 nm to about 2 microns.

Feature 30. The method according to any one of Features 21-31, wherein the polyelectrolyte complex nanoparticles have an average diameter of about 100 nm to about 600 nm.

Feature 31. The method according to any one of Features 21-31, wherein at least 60% of the polyelectrolyte complex nanoparticles are stable for a period of at least 2 days, 5 days, or 7 days at a temperature of about 150° C., about 65° C., or about 40° C.

We claim:

1. A fluid loss control composition comprising polyelectrolyte complex nanoparticles formed of at least the following components:
   (i) a polycation polymer;
   (ii) a polyanion polymer, wherein the polyanion polymer comprises a plurality of carboxylic acid or sulfonic functional groups, and the polyanion polymer has a molecular weight of about 4000 Da to about 20 kDa; and
   (iii) a fluid loss additive comprising carboxymethyl hydroxyethyl cellulose,
   wherein the fluid loss control composition does not include a plurality of metal ions.

2. The fluid loss control composition according to claim 1, wherein carboxymethyl hydroxyethyl cellulose has a molecular weight of about 60 kDa to about 100 kDa.

3. The fluid loss control composition according to claim 1, wherein the plurality metal ions comprise chromium ions, zirconium, titanium, aluminum ions, or a combination thereof.

4. The fluid loss control composition according to claim 1, wherein the polycation polymer comprises a plurality of amine functional groups.

5. The fluid loss control composition according to claim 1, wherein the polycation polymer has a molecular weight of about 800 Da to about 2500 kDa.

6. The fluid loss control composition according to claim 1, wherein the polycation polymer is a branched chain polymer.

7. The fluid loss control composition according to claim 1, wherein the polycation polymer is a polyethylenimine.

8. The fluid loss control composition according to claim 1, wherein the polyanion polymer is polyacrylic acid or poly(vinylsulfonic) acid.

9. The fluid loss control composition according to claim 1, wherein the polyelectrolyte complex nanoparticles have an average diameter of about 100 nm to about 2 microns.

10. The fluid loss control composition according to claim 1, wherein the polyelectrolyte complex nanoparticles have an average diameter of about 100 nm to about 600 nm.

11. The fluid loss control composition according to claim 1, wherein at least 60% of the polyelectrolyte complex nanoparticles are stable for a period of at least 2 days at a temperature of about 150° C.

12. A method of making a fluid loss control composition according to claim 1, the method comprising
  (i) mixing the polycation polymer and the fluid loss additive to form a first mixture; and
  (ii) adding the polyanion polymer to the first mixture to form the fluid loss control composition comprising the polyelectrolyte complex nanoparticles.

13. A method of preparing a slurry composition for controlling fluid loss in a cementing operation, the method comprising:
  dry blending a fluid loss additive powder and a dry cement powder to create a dry mixture;
  adding the dry mixture to a suspension containing polyelectrolyte complex nanoparticles of claim 1 in water to form the slurry.

14. The method according to claim 13, wherein the polyelectrolyte complex nanoparticles have an average diameter of about 100 nm to about 600 nm.

15. The method according to claim 13, wherein at least 60% of the polyelectrolyte complex nanoparticles are stable for a period of at least 2 days at a temperature of about 150° C.

* * * * *